US007724250B2

(12) United States Patent
Ishii et al.

(10) Patent No.: US 7,724,250 B2
(45) Date of Patent: May 25, 2010

(54) APPARATUS, METHOD, AND PROGRAM FOR PROCESSING INFORMATION

(75) Inventors: Shinya Ishii, Tokyo (JP); Hiroyuki Segawa, Kanagawa (JP); Norikazu Hiraki, Kanagawa (JP); Yuichi Abe, Tokyo (JP); Ryoichi Imaizumi, Tokyo (JP); Kenichiro Nakamura, Saitama (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 10/742,701

(22) Filed: Dec. 19, 2003

(65) Prior Publication Data
US 2004/0130579 A1 Jul. 8, 2004

(30) Foreign Application Priority Data
Dec. 19, 2002 (JP) ............................ P2002-368664

(51) Int. Cl.
*G06T 15/00* (2006.01)
*G06T 17/00* (2006.01)
*G06T 15/10* (2006.01)
*G06T 15/20* (2006.01)
*G06F 3/00* (2006.01)
*G09B 25/00* (2006.01)

(52) U.S. Cl. ........................ 345/419; 345/420; 345/427; 715/757; 434/79; 434/80

(58) Field of Classification Search ................ 345/427, 345/156, 158, 419, 664, 679, 420; 700/65; 715/848, 849, 850, 851, 852, 757; 463/1, 463/8, 39; 434/79, 80

See application file for complete search history.

(56) References Cited

U.S. PATENT DOCUMENTS 4,860,220 A * 8/1989 Tanaka et al. ............... 345/420

(Continued)

FOREIGN PATENT DOCUMENTS

EP 1211647 A1 * 6/2002

(Continued)

OTHER PUBLICATIONS

Gausemeier et al., "AR-planning tool: designing flexible manufacturing systems with augmented reality", Proceedings of the Workshop on Virtual Environments 2002, ACM International Conference Proceeding Series, vol. 23, pp. 19-25.*

(Continued)

*Primary Examiner*—Ulka Chauhan
*Assistant Examiner*—Roberta Prendergast
(74) *Attorney, Agent, or Firm*—K&L Gates LLP

(57) ABSTRACT

An information processing apparatus is provided which allows a user to easily and intuitively manipulate information in a 3-dimensional virtual space. In the information processing apparatus, a main controller sets a first coordinate system in a real space on the basis of information associated with a real object and further sets a second coordinate system in a 3-dimensional virtual space corresponding to the real space on the basis of the first coordinate system. If a user places an input device at a particular position and angle in the first coordinate system with reference to the real object, the main controller places an object in the 3-dimensional virtual space at a place and angle in the second coordinate system corresponding to the place and angle of the input device in the first coordinate system, and the main controller displays an image of the object placed in the 3-dimensional virtual space on a display.

24 Claims, 13 Drawing Sheets

U.S. PATENT DOCUMENTS

| | | | | |
|---|---|---|---|---|
| 4,902,229 | A * | 2/1990 | Pedersen et al. | 434/80 |
| 5,227,985 | A * | 7/1993 | DeMenthon | 702/153 |
| 5,237,647 | A * | 8/1993 | Roberts et al. | 345/419 |
| 5,261,041 | A * | 11/1993 | Susman | 345/473 |
| 5,287,437 | A * | 2/1994 | Deering | 345/427 |
| 5,297,061 | A * | 3/1994 | Dementhon et al. | 345/180 |
| 5,347,459 | A * | 9/1994 | Greenspan et al. | 700/255 |
| 5,355,314 | A * | 10/1994 | Feigenbaum | 345/629 |
| 5,394,202 | A * | 2/1995 | Deering | 353/7 |
| 5,418,712 | A * | 5/1995 | Miwa et al. | 700/83 |
| 5,423,554 | A * | 6/1995 | Davis | 463/4 |
| 5,446,834 | A * | 8/1995 | Deering | 345/427 |
| 5,495,576 | A * | 2/1996 | Ritchey | 345/420 |
| 5,548,694 | A * | 8/1996 | Frisken Gibson | 345/424 |
| 5,616,078 | A * | 4/1997 | Oh | 463/8 |
| 5,729,471 | A * | 3/1998 | Jain et al. | 725/131 |
| 5,745,126 | A * | 4/1998 | Jain et al. | 382/154 |
| 5,766,016 | A * | 6/1998 | Sinclair et al. | 434/262 |
| 5,844,392 | A * | 12/1998 | Peurach et al. | 318/568.17 |
| 5,846,086 | A * | 12/1998 | Bizzi et al. | 434/247 |
| 5,846,134 | A * | 12/1998 | Latypov | 463/46 |
| 5,847,710 | A * | 12/1998 | Kroitor | 345/421 |
| 5,850,352 | A * | 12/1998 | Moezzi et al. | 345/419 |
| 5,883,628 | A * | 3/1999 | Mullaly et al. | 715/850 |
| 5,903,271 | A * | 5/1999 | Bardon et al. | 345/419 |
| 5,913,727 | A * | 6/1999 | Ahdoot | 463/39 |
| 5,923,318 | A * | 7/1999 | Zhai et al. | 345/157 |
| 6,016,147 | A * | 1/2000 | Gantt | 345/420 |
| 6,020,891 | A * | 2/2000 | Rekimoto | 345/419 |
| 6,028,593 | A * | 2/2000 | Rosenberg et al. | 345/156 |
| 6,034,739 | A * | 3/2000 | Rohlfing et al. | 348/586 |
| 6,069,634 | A * | 5/2000 | Gibson | 345/424 |
| 6,072,902 | A * | 6/2000 | Myers | 382/167 |
| 6,084,587 | A * | 7/2000 | Tarr et al. | 345/419 |
| 6,151,009 | A * | 11/2000 | Kanade et al. | 345/641 |
| 6,191,796 | B1 * | 2/2001 | Tarr | 345/581 |
| 6,222,465 | B1 * | 4/2001 | Kumar et al. | 341/20 |
| 6,226,004 | B1 * | 5/2001 | Nishihara | 345/420 |
| 6,307,563 | B2 * | 10/2001 | Kimura | 345/474 |
| 6,308,144 | B1 * | 10/2001 | Bronfeld et al. | 703/2 |
| 6,308,565 | B1 * | 10/2001 | French et al. | 73/379.04 |
| 6,342,878 | B1 * | 1/2002 | Chevassus et al. | 345/158 |
| 6,392,644 | B1 * | 5/2002 | Miyata et al. | 345/419 |
| 6,411,266 | B1 * | 6/2002 | Maguire, Jr. | 345/8 |
| 6,452,604 | B1 * | 9/2002 | Sato | 345/619 |
| 6,466,239 | B2 * | 10/2002 | Ishikawa | 715/850 |
| 6,480,190 | B1 * | 11/2002 | Pfister et al. | 345/419 |
| 6,482,010 | B1 * | 11/2002 | Marcus et al. | 434/45 |
| 6,545,663 | B1 * | 4/2003 | Arbter et al. | 345/158 |
| 6,720,949 | B1 * | 4/2004 | Pryor et al. | 345/158 |
| 6,767,282 | B2 * | 7/2004 | Matsuyama et al. | 463/3 |
| 6,792,398 | B1 * | 9/2004 | Handley et al. | 703/2 |
| 6,795,068 | B1 * | 9/2004 | Marks | 345/419 |
| 6,937,235 | B2 * | 8/2005 | Fujiwara et al. | 345/420 |
| 6,937,255 | B2 * | 8/2005 | Fukuda et al. | 345/633 |
| 6,992,666 | B2 * | 1/2006 | Hiraki et al. | 345/419 |
| 7,001,272 | B2 * | 2/2006 | Yamashita et al. | 463/7 |
| 7,023,436 | B2 * | 4/2006 | Segawa et al. | 345/420 |
| 7,031,017 | B2 * | 4/2006 | Kaneko | 358/1.2 |
| 7,043,695 | B2 * | 5/2006 | Elber et al. | 715/771 |
| 7,139,685 | B2 * | 11/2006 | Bascle et al. | 703/1 |
| 7,171,627 | B2 * | 1/2007 | Sawatari | 715/848 |
| 7,193,633 | B1 * | 3/2007 | Reinhardt et al. | 345/629 |
| 7,224,357 | B2 * | 5/2007 | Chen et al. | 345/420 |
| 7,277,572 | B2 * | 10/2007 | MacInnes et al. | 382/154 |
| 7,319,466 | B1 * | 1/2008 | Tarr et al. | 345/419 |
| 2001/0024533 | A1 * | 9/2001 | Kriegman | 382/284 |
| 2001/0033280 | A1 * | 10/2001 | Abe et al. | 345/419 |
| 2002/0008720 | A1 * | 1/2002 | Hiraki et al. | 345/848 |
| 2002/0019675 | A1 * | 2/2002 | Hiraki et al. | 700/65 |
| 2002/0024517 | A1 * | 2/2002 | Yamaguchi et al. | 345/424 |
| 2002/0075286 | A1 * | 6/2002 | Yonezawa et al. | 345/679 |
| 2002/0107674 | A1 * | 8/2002 | Bascle et al. | 703/1 |
| 2002/0149603 | A1 * | 10/2002 | Frisken et al. | 345/630 |
| 2002/0151337 | A1 * | 10/2002 | Yamashita et al. | 463/8 |
| 2002/0196258 | A1 * | 12/2002 | Lake et al. | 345/474 |
| 2003/0078086 | A1 * | 4/2003 | Matsuyama et al. | 463/3 |
| 2003/0080976 | A1 * | 5/2003 | Satoh et al. | 345/629 |
| 2003/0085866 | A1 * | 5/2003 | Bimber et al. | 345/156 |
| 2003/0117397 | A1 * | 6/2003 | Hubrecht et al. | 345/420 |
| 2003/0117398 | A1 * | 6/2003 | Hubrecht et al. | 345/423 |
| 2003/0117402 | A1 * | 6/2003 | Hubrecht et al. | 345/473 |
| 2004/0109009 | A1 * | 6/2004 | Yonezawa et al. | 345/632 |

FOREIGN PATENT DOCUMENTS

| | | | |
|---|---|---|---|
| JP | 01-094420 | | 4/1989 |
| JP | 08-315179 | | 11/1996 |
| JP | 09-101742 | | 4/1997 |
| JP | 2000-020757 | | 1/2000 |
| JP | 2000194736 | A * | 7/2000 |
| JP | 2001266175 | A * | 9/2001 |
| JP | 2001-291119 | | 10/2001 |
| JP | 2001307134 | A * | 11/2001 |
| JP | 2001325602 | A * | 11/2001 |
| JP | 2001325611 | A * | 11/2001 |
| JP | 2001325614 | A * | 11/2001 |
| JP | 2002-279284 | | 9/2002 |
| WO | WO 01/80188 | A1 * | 10/2001 |

OTHER PUBLICATIONS

Fitzmaurice et al., "Bricks: laying the foundations for graspable user interfaces" Proceedings of the SIGCHI Conference on Human Factors in Computing Systems, ACM Press/Addison-Wesley Publishing Co., New York, NY, pp. 442-449.*

Ruddle et al, "Verbal communication during cooperative object manipulation" Proceedings of the 4th international Conference on Collaborative Virtual Environments, CVE '02, ACM Press, New York, NY, pp. 120-127.*

Fraser et al., "Revealing the realities of collaborative virtual reality", Proceedings of the Third international Conference on Collaborative Virtual Environments, CVE '00, ACM Press, New York, NY, pp. 29-37.*

Szalavári et al., "Collaborative gaming in augmented reality", Proceedings of the ACM Symposium on Virtual Reality Software and Technology, VRST '98, ACM Press, New York, NY, pp. 195-204.*

Welch, Greg, Gary Bishop, Leandra Vicci, Stephen Brumback, Kurtis Keller, and D'nardo Colucci. "High-Performance Wide-Area Optical Tracking: The HiBall Tracking System", Presence 2001: Teleoperators and Virtual Environments 10(1): 1-21.*

Takeo Igarashi , Satoshi Matsuoka , Hidehiko Tanaka, "Teddy: a sketching interface for 3D freeform design", Proceedings of the 26th annual conference on Computer graphics and interactive techniques, p. 409-416, Jul. 1999.*

Policarpo, F.; Azevedo, E.; Conci, A.; "Three-dimensional reconstruction of urban scenes from a single image", Proceedings. XV Brazilian Symposium on Computer Graphics and Image Processing, Oct. 7-10, 2002, p. 430.*

Tolba et al., "Sketching with projective 2D strokes", Proceedings of the 12th Annual ACM Symposium on User interface Software and Technology, Asheville, North Carolina, United States, Nov. 7-10, 1999, UIST '99. ACM, New York, NY, pp. 149-157.*

Aliakseyeu, et al., "Interaction techniques for navigation through and manipulation of 2D and 3D data", Proceedings of the Workshop on Virtual Environments 2002 (Barcelona, Spain, May 30-31, 2002), W. Stürzlinger and S. Müller, Eds., ACM International Conference Proceeding Series, vol. 23. Eurographics Association, pp. 179-188.*

Balakrishnan, R., Fitzmaurice, G., Kurtenbach, G., and Buxton, W. 1999. Digital tape drawing. In Proceedings of the 12th Annual ACM Symposium on User interface Software and Technology (Asheville, North Carolina, United States, Nov. 7-10, 1999). UIST '99. ACM, New York, NY, 161-169.*

Michalik, P., Kim, D. H., and Bruderlin, B. D. 2002. Sketch- and constraint-based design of B-spline surfaces. In Proceedings of the Seventh ACM Symposium on Solid Modeling and Applications (Saarbrücken, Germany, Jun. 17-21, 2002). SMA '02. ACM, New York, NY, 297-304.*

Wesche, G. and Seidel, H. 2001. FreeDrawer: a free-form sketching system on the responsive workbench. In Proceedings of the ACM Symposium on Virtual Reality Software and Technology (Baniff, Alberta, Canada, Nov. 15-17, 2001). VRST '01. ACM, New York, NY, 167-174.*

Office Action issued by the Japanese Patent Office on Jan. 22, 2007 for corresponding Japanese application 2002-368664.

http://www.discreet.jp/products/max5/index_max5.htm, Apr. 2004.

* cited by examiner ific example may be found, for example, in Japanese

APPARATUS, METHOD, AND PROGRAM FOR PROCESSING INFORMATION

BACKGROUND OF THE INVENTION

The present invention relates to an apparatus, a method, and a program for processing information and, more particularly, to an apparatus, a method, and a program for processing information which allow a user to deal with information associated with 3-dimensional virtual space in an easy and intuitive manner.

In recent years, great advances in information processing technology have been achieved, and it has become possible to easily represent and use a 3-dimensional virtual space via computer graphics (CG) using a general-purpose information processing apparatus, such as a personal computer, without necessitating a special computer.

Also, in recent years, great advances in information communication technology have been achieved, whereby it has become possible to easily share and/or distribute data among a number of clients (for example, information processing apparatuses) by using a server on a network such as the Internet.

Furthermore, in recent years, a combination of information processing technology and information communication technology has made it possible to share data in a 3-dimensional virtual space built on a server by a number of clients (a specific example may be found, for example, in Japanese Unexamined Patent Application Publication No. 2002-279284). Various kinds of service using such a technique are provided.

A coordinate system in a 3-dimensional virtual space represented by CG is generally set by a developer who has implemented the 3-dimensional virtual space on a server or the like. When a user manipulates an object in such a 3-dimensional virtual space using a particular input device, the manipulation is performed on the basis of the coordinate system predefined by the developer.

However, when the developer sets the coordinate system in the 3-dimensional virtual system, almost nothing associated with a real space, in which the user operates the input device, is taken into account. As a result, the user has to manipulate an object in the 3-dimensional virtual space via an unintuitive interface. This makes it very difficult to manipulate the object.

More specifically, when a mouse connected to a personal computer is used as the input device to manipulate the object in the 3-dimensional virtual space, the distance of movement of a mouse pointer (in the 3-dimensional virtual space) displayed on a screen is, in general, very different from the distance by which the mouse is actually moved in the real space.

For example, the user cannot intuitively predict how much to move the mouse in the real space in order to move the mouse pointer by a desired distance on the screen (for example from one end of the screen to the opposite end), in the 3-dimensional virtual space. Thus, the user has to learn how much to move the mouse to achieve desired motion of the mouse pointer by trying to move the mouse many times.

Besides, because of a difference between a view point in the 3-dimensional virtual space and a view point in the real space (in general, the view point is arbitrarily set in the 3-dimensional virtual space), the user cannot intuitively predict how to move the mouse in order to move the mouse pointer into a desired direction. Thus, the user has to try to move the mouse many times.

It is known that human eyes are poor in ability of recognition in a direction (depth direction) directly away from a view point. Therefore, when an image representing a 3-dimensional virtual space is displayed on a 2-dimensional screen of a display such as a CRT (Cathode Ray Tube), it is very difficult for the user to achieve intuitive recognition in a direction directly away from view point in the 3-dimensional virtual space. In other words, it is very difficult to display an image representing a 3-dimensional virtual space on a 2-dimensional screen of a display such that the user can achieve intuitive recognition in a direction away from a view point in the 3-dimensional virtual space.

In many cases, in conventional application software based on a 3-dimensional CG model (such as "3ds max" whose description may be found, for example, on Web page "http://www.discreetjp/products/max5/index_max5.htm" (which is accessible as of Nov. 8, 2002)), a 3-dimensional virtual space including an object is displayed via a three-view drawing. That is, the 3-dimensional virtual space including the object is displayed in a front view, a top view, and a side view. This technique allows a user to achieve recognition in a direction away from a view point in the 3-dimensional virtual space.

However, in the three-view drawing, it is necessary to display at least three views including the front view, the top view, and the side view on the single screen (that is, the screen is divided into three parts). Such a manner of displaying an object is unnatural. Besides, recognition in a direction away from a view point is not intuitive, although recognition is possible by analyzing all three views.

SUMMARY OF THE INVENTION

In view of the above, it is an object of the present invention to provide a technique that allows a user to easily and intuitively deal with information in a 3-dimensional virtual space.

The present invention provides an information processing apparatus for controlling the display of an image in a 3-dimensional virtual space, which includes a setting part for setting a first coordinate system in a real space including a first real object on the basis of pre-input information associated with the first real object and for setting a second coordinate system in the 3-dimensional virtual space corresponding to the real space on the basis of the first coordinate system, a construction part for constructing the 3-dimensional virtual space using the second coordinate system set by the setting part, and a display control part for controlling the display of an image corresponding to the 3-dimensional virtual space constructed by the construction part.

In this information processing apparatus, the first real object may be a real object whose cross-sectional area is greater, at least in a predetermined direction, than a predetermined value.

The first real object may be a sheet-shaped real object or a stack of sheet-shaped real objects.

The information processing apparatus may further include an input part for inputting specification information specifying the position and the angle of a particular virtual object in the 3-dimensional virtual space, and a determination part for determining the position and the angle, in the second coordinate system, of the virtual object on the basis of the specification information input via the input part, wherein the construction part may construct the 3-dimensional virtual space including the virtual object disposed at the position and the angle in the second coordinate system determined by the determination means.

In this information processing apparatus, if a second real object corresponding to the virtual object is placed in the real space, the input part may measure the position and the angle of the second real object in the real space using a third coordinate system different from the first coordinate system and may input the measurement result as the specification information, the determination part may convert the coordinates of the position and the angle, input via the input part, of the second real object from the third coordinate system into the second coordinate system and may employ the position and the angle of the second real object converted in the second coordinate system as the position and the angle of the virtual object in the second coordinate system.

The input part may use at least a part of the input part itself as the second real object.

The input part may use, as the second real object, a real object having a feature similar to a particular feature of the virtual object.

The construction part may construct the 3-dimensional virtual space such that the image displayed under the control of the display control part includes at least a virtual region corresponding to the first real object.

The present invention also provides an information processing method for controlling the display of an image in a 3-dimensional virtual space, which includes the steps of setting a first coordinate system in a real space including a real object on the basis of pre-input information associated with the real object and setting a second coordinate system in the 3-dimensional virtual space corresponding to the real space on the basis of the first coordinate system, constructing the 3-dimensional virtual space using the second coordinate system set in the setting step, and controlling the display of an image corresponding to the 3-dimensional virtual space constructed in the constructing step.

The present invention also provides a program for causing a computer to execute a process of controlling the display of an image in a 3-dimensional virtual space, the process including the steps of setting a first coordinate system in a real space including a real object on the basis of pre-input information associated with the real object and setting a second coordinate system in the 3-dimensional virtual space corresponding to the real space on the basis of the first coordinate system, constructing the 3-dimensional virtual space using the second coordinate system set in the setting step, and controlling the display of an image corresponding to the 3-dimensional virtual space constructed in the constructing step.

In the apparatus, method, and program for processing information according to the present invention, a first coordinate system in a real space including a real object is set on the basis of pre-input information associated with the real object, and a second coordinate system in a 3-dimensional virtual space corresponding to the real space is set on the basis of the first coordinate system. The 3-dimensional virtual space is constructed using the second coordinate system, and an image corresponding to the constructed 3-dimensional virtual space is displayed.

The display for displaying the image under the control of the information processing apparatus according to the present invention may be disposed on the information processing apparatus itself or may be disposed separately on the outside of the information processing apparatus. Similarly, the input device for inputting information to the information processing apparatus according to the present invention may be disposed in the information processing apparatus itself or may be disposed separately on the outside of the information processing apparatus.

Additional features and advantages of the present invention are described in, and will be apparent from, the following Detailed Description of the Invention and the Figures.

DETAILED DESCRIPTION OF THE INVENTION

Figure 1:
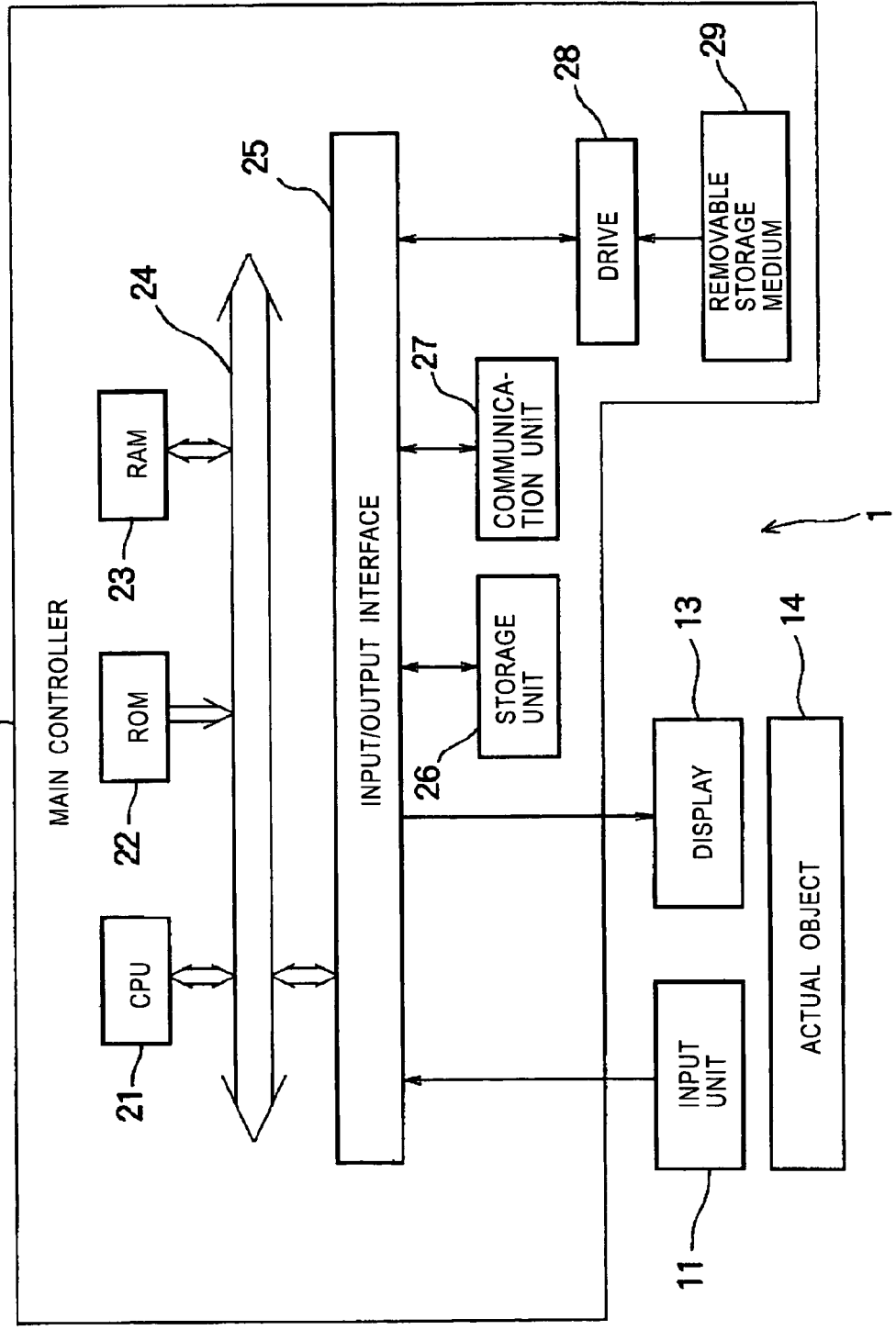
FIG. 1 is a block diagram showing an example of a hardware configuration of an information processing apparatus according to an embodiment of the present invention.

FIG. 1 shows the hardware construction of an information processing apparatus according to an embodiment of the present invention.

As shown in FIG. 1, the information processing apparatus 1 includes an input unit 11, a main controller 12, and a display 13. The information processing apparatus 1 is used in conjunction with a real object 14.

In the present embodiment, for example, the main controller 12 constructs a 3-dimensional virtual space on the basis of particular information (for example, information indicating the shape, the position, and/or the angle) of the real object 14 and the main controller 12 displays, on the display 13, an image corresponding to the constructed 3-dimensional virtual space. When the user operates the input unit 11, the main controller 12 changes the position and/or the angle of a particular 3-dimensional virtual object (hereinafter, referred to simply as an object) in the 3-dimensional virtual space (that is, the main controller 12 reconstructs the 3-dimensional virtual space) in accordance with the operation performed by the user, and the main controller 12 displays a corresponding image on the display 13. The purpose or use of the information processing apparatus 1 is not limited to that in the present embodiment, but may be used for various purposes in which a coordinate system of a 3-dimensional virtual space defined in a manner described later is used.

The input unit 11 has a first capability, as one of many basic capabilities, of inputting specification information indicating the position and the angle of an object in the 3-dimensional virtual space to the main controller 12. By using the first capability of the input unit 11, the user can freely move an object within the 3-dimensional virtual space.

In other words, the input unit 11 is not limited to any special type, as long as it has the capability of inputting specification information indicating the position and the angle of an object in the 3-dimensional virtual space to the main controller 12. For example, the input unit 11 may be embodied as a 3-dimensional position/angle sensor. More specifically, a 3-dimensional position/angle sensor of the magnetic, optical, ultrasonic, or mechanical type can be used as the input unit 11. As a matter of course, the input unit 11 is not limited to the 3-dimensional position/angle sensor, but another type input device such as an on/off input device (for example, a keyboard or a mouse) or a 2-dimensional position input device may be used.

In the present embodiment, as described later, at least two different coordinate systems including a 3-dimensional coordinate system in a real space (for example, a coordinate system (rx, ry, rz) in a real space 31 described later with reference to FIG. 6) and a coordinate system that defines a 3-dimensional virtual space (for example, a coordinate system (vx, vy, vz) in a 3-dimensional virtual space 32 described later with reference to FIG. 7) are used by the information processing apparatus 1. The correspondence between those two coordinate systems is defined on the basis of particular information (for example, shape, position, angle, etc.) associated with the real object 14.

For the above reason, it is necessary to input the information associated with the real object 14 to the main controller 12 before the two coordinate systems are defined. For the above purpose, the input unit 11 has, in addition to the first capability described above, a second capability of inputting necessary data to the main controller 12 so that the user can input information associated with the real object 14 to the main controller 12 by using the second capability of the input unit 11.

Herein, an input device included in the input unit 11 and having the first capability may further include the second capability described above (that is, the input unit 11 is formed of a single input device) or another input device having the second capability may be disposed in the input unit 11 in addition to the input device having the first capability. More specifically, an imaging device such as a camera can be used as the input device having the second capability. For example, the image of the real object 14 is taken by a camera, and the resultant image data of the real object 14 is processed by the main controller 12 thereby acquiring the information associated with the real object 14. As described above, the input unit 11 does not necessarily need to be formed of a single input device, but may be arbitrarily configured using an arbitrary number of devices, as long as the first and second capabilities are achieved.

In a case in which the shape or the like of the real object 14 has already been given, values indicating the shape may be input as the information associated with the real object 14 to the information processing apparatus 1 before the information processing apparatus 1 is used by a user (for example, before the information processing apparatus 1 is shipped). In this case, the input unit 11 does not need to have the second capability of inputting information associated with the real object 14. In a case in which the information processing apparatus 1 is used only to define the coordinate systems, the first capability is also unnecessary. In this case, the information processing apparatus 1 does not necessarily need to include the input unit 11.

The data that is input using the second capability is not limited to the above-described information associated with the real object 14. For example, in the present embodiment, and as further described later, an image representing a scene seen from a particular view point in the 3-dimensional virtual space is displayed on the display 13. Therefore, information indicating the view point may be input to the main controller 12 by using the second capability.

The main controller 12 is formed of, for example, a main part of a personal computer (part of a personal computer other than an input device such as a keyboard and an output device such as a display). The main controller 12 performs a transform between different coordinate systems and constructs a 3-dimensional virtual space. The main controller 12 further produces an image signal representing the constructed 3-dimensional virtual space and outputs the resultant image signal to the display 13.

In the main controller 12, a CPU (Central Processing Unit) 21 performs various kinds of processing in accordance with programs stored in a ROM (Read Only Memory) 22 or programs loaded into a RAM (Random Access Memory) 23 from a storage unit 26. The RAM 23 is also used to store data used by the CPU 21 in performing various kinds of processing.

The CPU 21, the ROM 22, and the RAM 23 are connected with each other via a bus 24. The bus 24 is also connected with an input/output interface 25.

The input unit 11 described above and the display 13 described later are connected with the input/output interface 25.

The input/output interface 25 is also connected with the storage unit 26 including a hard disk or the like and with a communication unit 27 for communication with another information processing apparatus (not shown) via a network such as the Internet.

Furthermore, the input/output interface 25 is also connected with a drive 28, as required. A removable storage medium 29 such as a magnetic disk, an optical disk, a magnetooptical disk, or a semiconductor memory is mounted on the drive 28 as required, and a computer program is read from the removable storage medium 29 and installed into the storage unit 26, as required.

As for the display 13, a CRT (Cathode Ray Tube) display, a liquid crystal display, or a projector is used. The display 13 is used to display an image corresponding to the 3-dimensional virtual space in accordance with data output from the main controller 12.

The real object 14 serves as a reference object used by the main controller 12 in constructing a 3-dimensional virtual space. The real object 14 is an object that actually exists in the real space. The material of the real object 14 is not limited to a particular one, as long as the real object 14 has a finite area when viewed from above (that is, as long as the real object 14 has a cross section, taken in a horizontal plane, greater than a predetermined area). More specifically, a sheet, a book, or a diorama model may be used as the real object 14.

As described earlier, various coordinate systems are set in accordance with information associated with the real object 14. Therefore, after the information associated with the real object 14 is been input, it is required that the real object 14 be placed at the position and the angle that are employed when the information associated with the real object 14 is input.

Figure 2:
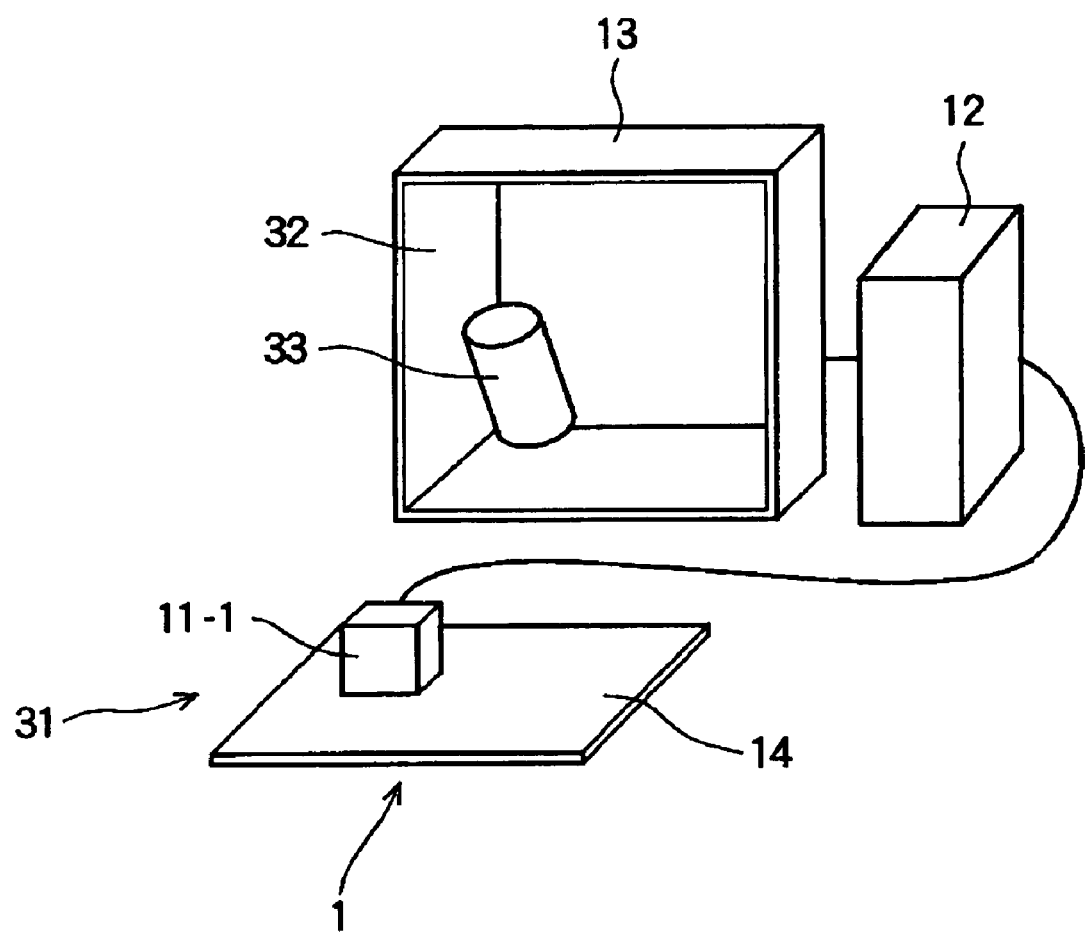
FIG. 2 is a diagram showing an example of an outward appearance of the information processing apparatus shown in FIG. 1.

FIG. 2 shows an example of a construction of the information processing apparatus 1.

In the example shown in FIG. 2, an object in the form of a sheet is employed as the real object 14. The main part of a desktop personal computer is used as the main controller 12. The main controller 12 constructs a 3-dimensional virtual space 32 on the basis of pre-input information associated with the real object 14. A CRT display is used as the display 13. The display 13 displays an image corresponding to the 3-dimensional virtual space 32 constructed by the main controller 12. A 3-dimensional position/angle sensor 11-1 is used as a part having the first capability included in the input unit 11. The 3-dimensional position/angle sensor 11-1 measures the position and the angle of an object (the 3-dimensional position/angle sensor 11-1 itself, in the example shown in FIG. 2) to be measured in the real space 31, and the 3-dimensional position/angle sensor 11-1 supplies the measurement result to the main controller 12.

An object (image) 33 is included in the 3-dimensional virtual space (image) 32 displayed on the display 13, wherein the object 33 is linked with the 3-dimensional position/angle sensor 11-1. As described earlier, the coordinate system is defined in the 3-dimensional virtual space 32 on the basis of the information associated with the real object 14 and, thus, the real object 14 serves as a reference of the coordinate system of the 3-dimensional virtual space 32.

Therefore, if a user places the 3-dimensional position/angle sensor 11-1 at a desired position and angle in the real space 31 with reference to the real object 14, the result of measurement performed by the 3-dimensional position/angle sensor 11-1 (the position and the angle of the 3-dimensional position/angle sensor 11-1 itself) is input to the main controller 12 as specification information specifying the position and the angle of the object 33 in the 3-dimensional virtual space 32. As a result, the object 33 is placed at the specified position and angle (corresponding to the position and angle of the 3-dimensional position/angle sensor 11-1) in the 3-dimensional virtual space 32. That is, an image of the 3-dimensional virtual space 32 including the object 33 placed at the position and angle specified by the user is displayed on the display 13.

Figure 3:
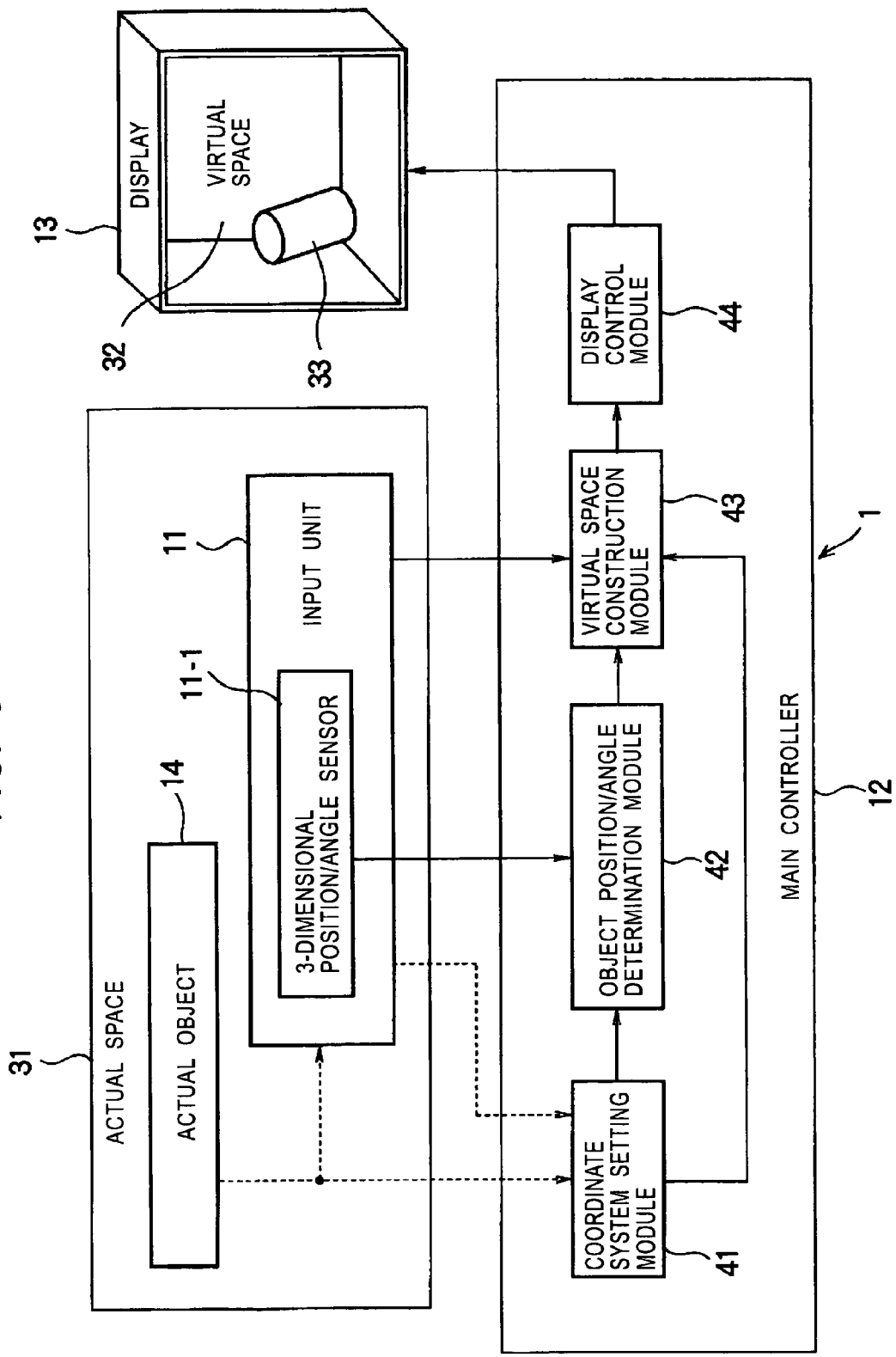
FIG. 3 is a block diagram showing an example of a software configuration of the information processing apparatus shown in FIG. 1.

FIG. 3 shows an example of a software program that implements, of various functions of the main controller 12 (FIG. 2) of the information processing apparatus 1, functions of defining a coordinate system of a 3-dimensional virtual space, constructing a 3-dimensional virtual space using the defined coordinate system, and controlling the display of an image corresponding to the 3-dimensional virtual space (the image includes an image of the object) (hereinafter, the process of controlling the display of such an image will be referred to as a process of controlling a 3-dimensional image).

As shown in FIG. 3, the software program includes a number of modules such as a coordinate system setting module 41, an object position/angle determination module 42, a virtual space construction module 43 and a display control module 44. Each of the modules has its own algorithm and performs a specific operation according to the algorithm. Each module is called by the CPU 21 (FIG. 1) and executed, as required.

The coordinate system setting module 41 sets a first coordinate system (for example, a coordinate system (rx, ry, rz) of a real space 31 described later with reference to FIG. 6) on the basis of pre-input particular information associated with the real object 14 (for example, the shape, the position, the angle, and/or the like of the real object 14) in the real space 31 including the real object 14. On the basis of the resultant first coordinate system, the coordinate system setting module 41 further sets a second coordinate system (for example, a coordinate system (vx, vy, vz) of a 3-dimensional virtual space 32 described later with reference to FIG. 7) in the 3-dimensional virtual space 32 corresponding to the real space 31. The coordinate system setting module 41 also calculates a correspondence (a coordinate transform function) between those two coordinate systems.

The object position/angle determination module 42 determines the position and the angle of the object 33 in the second coordinate system set by the coordinate system setting module 41 in accordance with information input using the above-described first capability of the input unit 11 (hereinafter, the information input using the first capability will be referred to as position/angle information to distinguish it from information input using the second capability of the input unit 11, wherein, in the example shown in FIG. 3, the result of measurement performed by the 3-dimensional position/angle sensor 11-1 is the position/angle information).

The virtual space construction module 43 produces image data corresponding to a scene, seen from a particular view point (in the example shown in FIG. 3, a view point specified by information input via the input unit 11), in the 3-dimensional virtual space 32 defined by the second coordinate system set by the coordinate system setting module 41, and the virtual space construction module 43 supplies the produced image data to the display control module 44. Hereinafter, producing such image data of the 3-dimensional virtual space 32 will be referred to as "constructing the 3-dimensional virtual space 32."

When the position and the angle of the object 33 in the second coordinate system are determined by the object position/angle determination module 42, the virtual space construction module 43 constructs the 3-dimensional virtual space 32 in which the object 33 is placed at the determined position and angle, and the virtual space construction module 43 supplies the data indicating the resultant 3-dimensional virtual space 32 to the display control module 44.

The display control module 44 controls the display 13 so as to display thereon an image corresponding to the 3-dimensional virtual space 32 constructed by the virtual space construction module 43. More specifically, the display control module 44 converts the image data supplied from the virtual space construction module 43 into an image signal in a format adapted to the display 13 and supplies the resultant image signal to the display 13. The display 13 displays an image corresponding to the received image signal (an image corresponding to the 3-dimensional virtual space 32).

Figure 4:
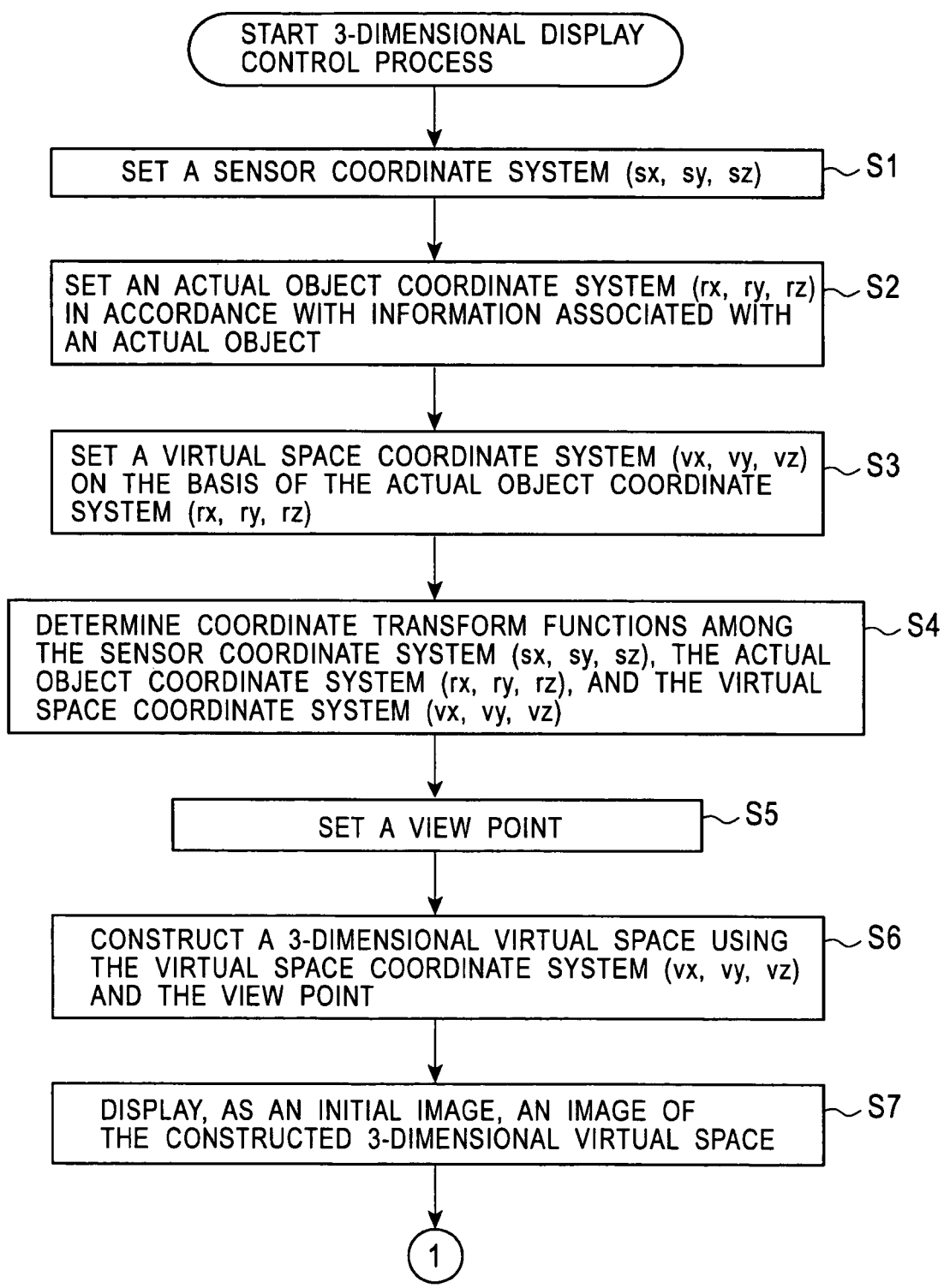
FIG. 4 is a flow chart showing an example of a control process in displaying a 3-dimensional image by the information processing apparatus shown in FIG. 3.
Figure 5:
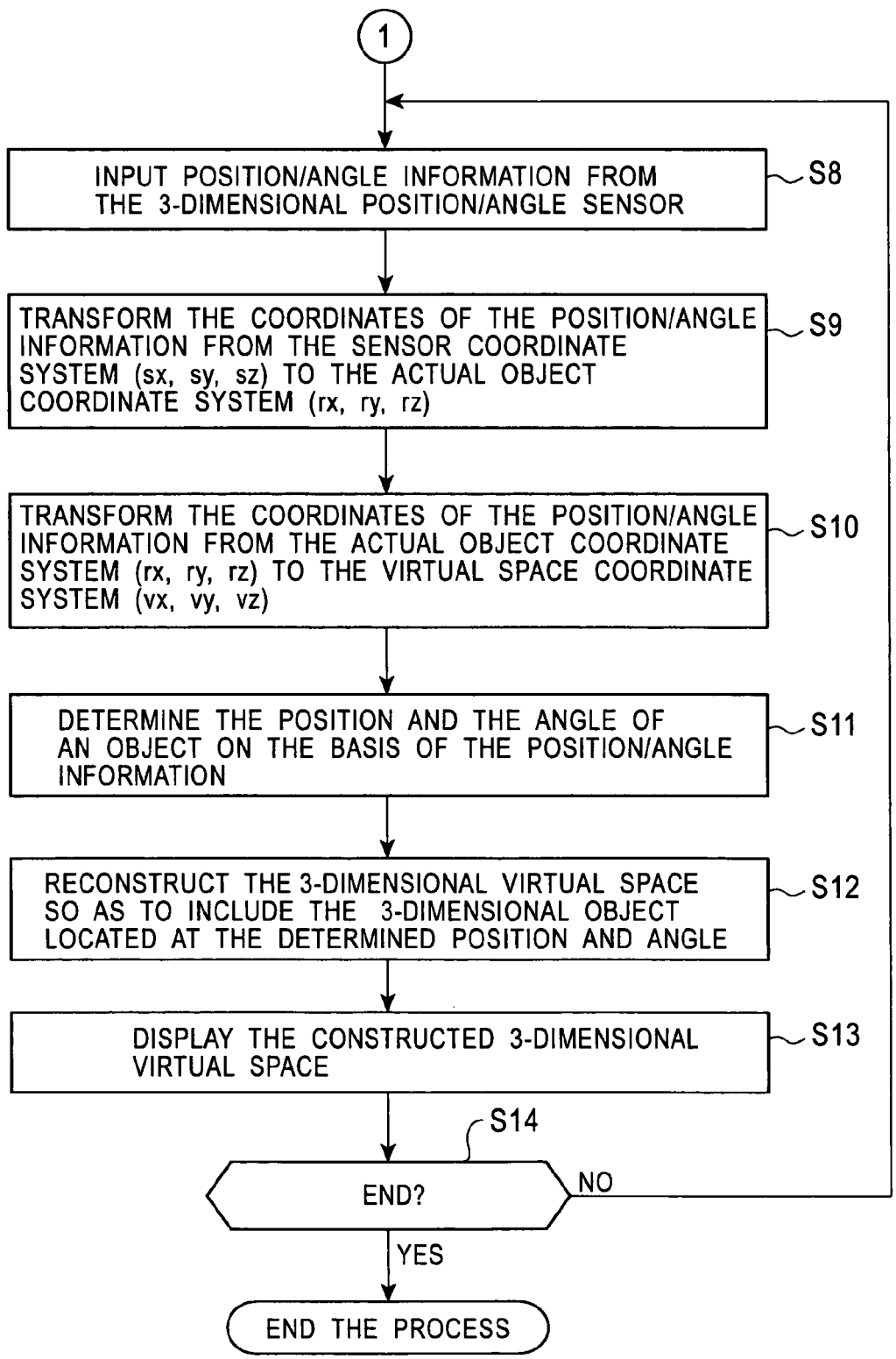
FIG. 5 is a flow chart showing an example of a control process in displaying a 3-dimensional image by the information processing apparatus shown in FIG. 3.

Referring to flow charts shown in FIGS. 4 and 5, an example of a process performed by the main controller 12

(FIG. 3) of the information processing apparatus 1 to control the display of a 3-dimensional image is described below.

In this example, the information processing apparatus 1 is assumed to be configured as shown in FIG. 2. That is, the part having the first capability of the input unit 11 is embodied as a 3-dimensional position/angle sensor 11-1 of a particular type. In this example, the 3-dimensional position/angle sensor 11-1 detects the position and the angle (position/angle information) of the 3-dimensional position/angle sensor 11-1 and supplies, to the main controller 12, the detected position/angle information expressed in a coordinate system (sx, sy, sz) specific to the 3-dimensional position/angle sensor 11-1. An example of the coordinate system (sx, sy, sz) specific to the 3-dimensional position/angle sensor 11-1 is shown in FIG. 6.

Figure 6:
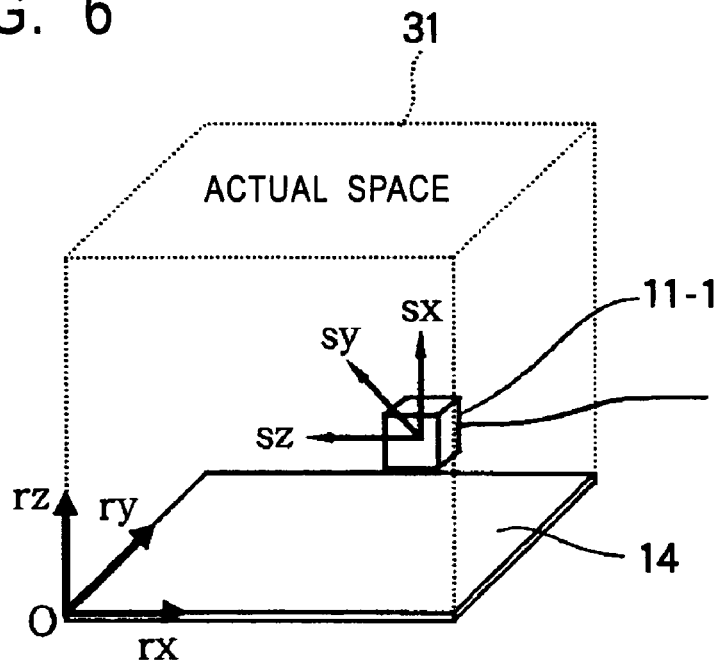
FIG. 6 is a diagram showing a coordinate system of a real space defined with reference to a real object by the information processing apparatus shown in FIG. 3.

First, in step S1 shown in FIG. 4, the coordinate system setting module 41 sets the sensor coordinate system (sx, sy, sz) shown in FIG. 6, on the basis of sensor information of the 3-dimensional position/angle sensor 11-1. That is, in an initial setting, the sensor coordinate system (sx, sy, sz) specific to the 3-dimensional position/angle sensor 11-1 is registered in preparation for use in the following processes.

In step S2, the coordinate system setting module 41 sets the first coordinate system (rx, ry, rz) in the real space 31 (hereinafter, such a coordinate system will be referred to as a real object coordinate system (rx, rx, rz) to distinguish it from the sensor coordinate system) on the basis of information associated with the real object 14 (the shape, the position, the angle, and/or the like of the real object 14).

In the present example, it is assumed that the shape, the position, and the angle of the real object 14 are predetermined and information indicating the shape, the position, and the angle of the real object 14 are pre-input to the main controller 12 (and stored in the storage unit 26 or the like shown in FIG. 1).

Note that the information associated with the real object 14 is not limited to such information. For example, in step S2, information may be input by a user using the input unit 11 (an input device such as a keyboard different from the 3-dimensional position/angle sensor 11-1) for use as the information associated with the real object 14. Alternatively, an image of the real object 14 may be taken by a camera or the like provided as a part of the input unit 11 other than the 3-dimensional position/angle sensor 11-1, and may be subjected to pattern recognition thereby producing information for use as the information associated with the real object 14.

In the present example, it is assumed that the real object coordinate system (rx, ry, rz) is defined (set) as shown in FIG. 6. In the real object coordinate system (rx, ry, rz) shown in FIG. 6, the sheet surface of the real object 14 is employed as a X-Y plane, and a Z axis is taken in a direction normal to the sheet surface of the real object 14. The origin (denoted by O in FIG. 6) is taken at a front left corner point (in FIG. 6) of the real object 14. As a matter of course, the X-Y plane and the Z axis may be defined in a manner different from that shown in FIG. 6, and the coordinate system may be defined differently, as long as particular one or more pieces of information associated with the real object 14 are used as the reference.

For example, in a case in which the real object 14 is an object in the form of a rectangular sheet, the origin may be taken at one of corner points, and coordinate axes may be taken along sides of the rectangular sheet. When the real object 14 has an arbitrary shape, lines drawn on the real object 14 or boundaries between different colors or the like on the real object 14 may be employed as the reference.

This also holds in definition of coordinate systems described later.

Referring again to FIG. 4, in step S3, the coordinate system setting module 41 sets the second coordinate system (vx, vy, vz) in the 3-dimensional virtual space 32 (hereinafter, referred to as the virtual space coordinate system (vx, vy, vz)) on the basis of the real object coordinate system (rx, ry, rz) set using the real object 14.

Figure 7:
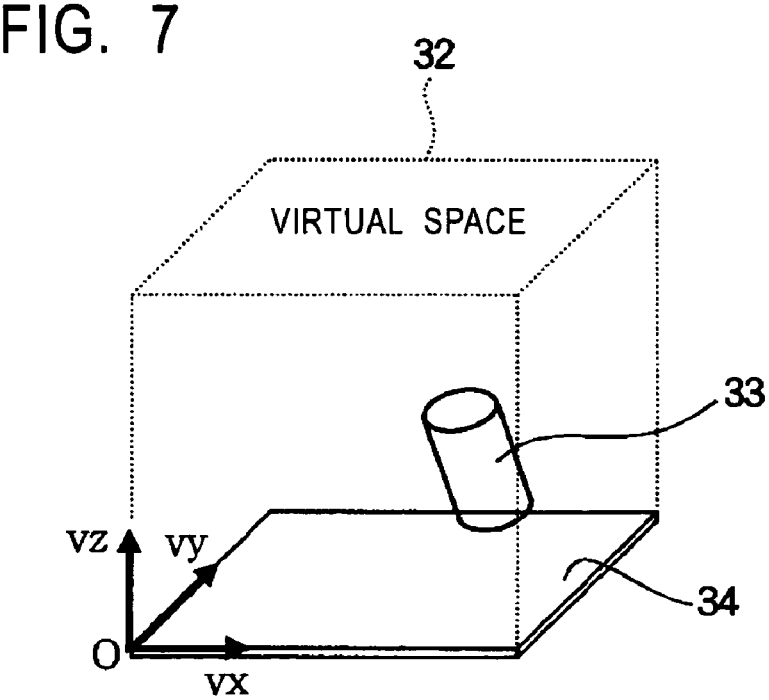
FIG. 7 is a diagram showing a coordinate system of a 3-dimensional virtual space defined on the basis of the coordinate system of the real space shown in FIG. 6 by the information processing apparatus shown in FIG. 3.

In the present example, the virtual space coordinate system (vx, vy, vz) is set as shown in FIG. 7. More specifically, in the virtual space coordinate system (vx, vy, vz) shown in FIG. 7, a virtual region 34 corresponding to the real object 14 shown in FIG. 6 (corresponding to the region where the sheet-shaped real object 14 is located) is set, and the upper surface (corresponding to the surface of the real object 14) of the virtual region 34 is employed as the X-Y plane, and the Z axis is taken in a direction normal to the upper surface of the virtual region 34. The origin (denoted by O in FIG. 7) is taken at a front left corner point (in FIG. 7) of the upper surface of the virtual region 34. As a matter of course, the X-Y plane and the Z axis may be defined in a manner different from that shown in FIG. 6, and the coordinate system may be defined differently.

Figure 8:
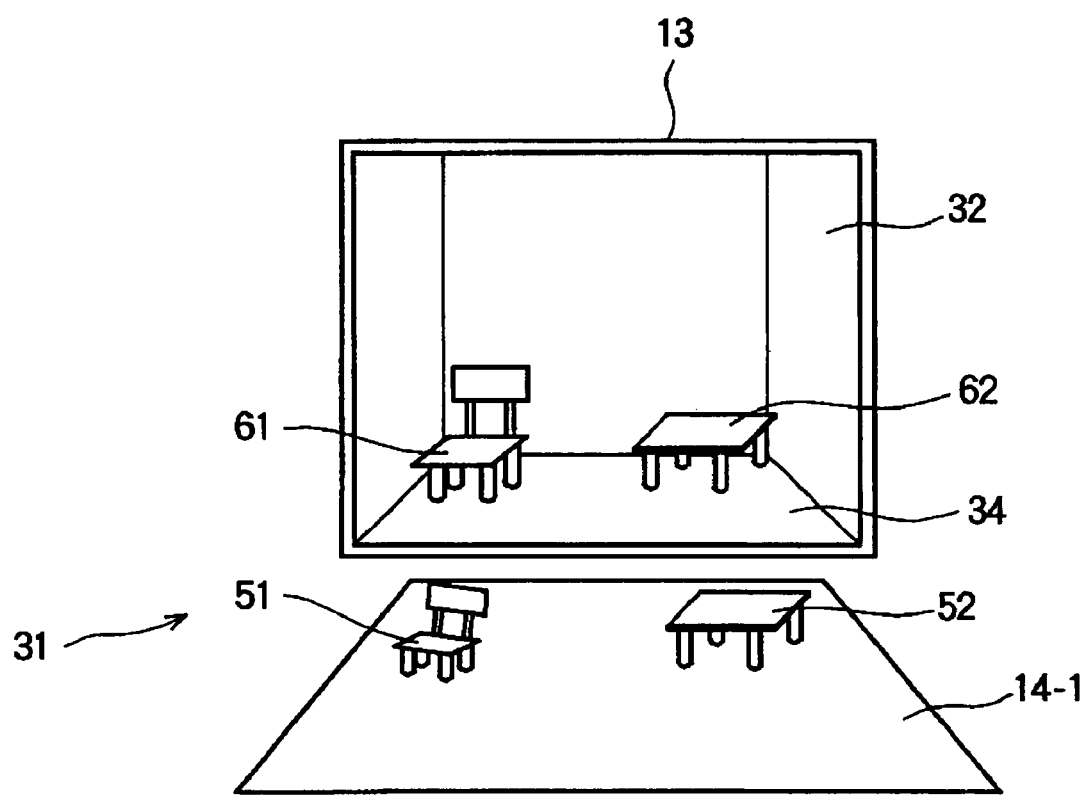
FIG. 8 is a diagram showing an example of a manner in which a 3-dimensional virtual space constructed on the basis of the coordinate system shown in FIG. 7 is displayed.

The user can move the object 33 in the 3-dimensional virtual space 32 by moving the 3-dimensional position/angle sensor 11-1 (FIG. 6) with respect to the real object 14 employed as the reference plane. If an image corresponding to the real object 14 is displayed on the display 13, it becomes easier for the user to intuitively manipulate the object 33. For the above purpose, it is desirable that the virtual space coordinate system (vx, vy, vz) be set such that the virtual region 34 corresponding to the real object 14 is displayed on the display 13. As a matter of course, the virtual region may be displayed explicitly (so as to be seen by the user) as a room floor or the like as shown in FIG. 8 or may be displayed as a transparent region (that cannot be seen by the user).

Referring again to FIG. 4, in step S4, the coordinate system setting module 41 determines coordinate transform functions that define correspondences among the sensor coordinate system (sx, sy, sz), the real object coordinate system (rx, ry, rz), and the virtual space coordinate system (vx, vy, vz) set in steps S1 to S3.

That is, the correspondences among those coordinate systems are represented in the form of mathematical expressions by the coordinate transform functions.

More specifically, in the present example, coordinate transform functions are given by the following equations (1) and (2).

$$\begin{bmatrix} rx \\ ry \\ rz \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix} \begin{bmatrix} sx \\ sy \\ sz \\ 1 \end{bmatrix} \quad (1)$$

$$\begin{bmatrix} vx \\ vy \\ vz \\ 1 \end{bmatrix} = \begin{bmatrix} n_{11} & n_{12} & n_{13} & n_{14} \\ n_{21} & n_{22} & n_{23} & n_{24} \\ n_{31} & n_{32} & n_{33} & n_{34} \\ n_{41} & n_{42} & n_{43} & n_{44} \end{bmatrix} \begin{bmatrix} rx \\ ry \\ rz \\ 1 \end{bmatrix} \quad (2)$$

Equation (1) represents a function used to transform the sensor coordinate system (sx, sy, sz) to the real object coordinate system (rx, ry, rz). In equation (1), m11 to m44 are elements of a transform matrix by which the sensor coordinate system (sx, sy, sz) is transformed to the real object coordinate system (rx, ry, rz).

Equation (2) represents a function used to transform the real object coordinate system (rx, ry, rz) to the virtual space coordinate system (vx, vy, vz). In equation (2), n11 to n44 are elements of a transform matrix by which the real object coordinate system (rx, ry, rz) is transformed to the virtual space coordinate system (vx, vy, vz).

More specifically, in the present example, the coordinate system setting module 41 determines the respective values of m11 to m44 and n11 to n44 via, for example, a least squares method thereby determining the coordinate transform functions that define the correspondences among the sensor coordinate system (sx, sy, sz), the real object coordinate system (rx, ry, rz), and the virtual space coordinate system (vx, vy, vz).

Note that the coordinate transform functions determined in step S4 and the method of determining the coordinate transform functions are not limited to those employed in the present example. For example, the coordinate transform functions may be determined by a nonlinear transform using a neural network that simulates functions of a human brain.

As described above, the coordinate system setting module 41 defines the virtual space coordinate system (vx, vy, vz) on the basis of the real object 14 by performing the process in steps S1 to S4.

In step S5, after the virtual space coordinate system (vx, vy, vz) is defined by the coordinate system setting module 41, the virtual space construction module 43 sets a view point. The view point may be set in an arbitrary manner, and a pre-registered view point may be employed. In this specific example, it is assumed that the view point is set in accordance with information (specific information used in setting the view point) input using the second capability of the input unit 11.

In step S6, the virtual space construction module 43 constructs the 3-dimensional virtual space 32 as shown in FIG. 7 on the basis of the virtual space coordinate system (vx, vy, vz) and the view point set in the previous steps.

In step S7, the display control module 44 displays an image of the 3-dimensional virtual space 32 constructed in step S6 by the virtual space construction module 43 on the display 13 as an initial image.

Herein, let us assume that the image shown in FIG. 8 is displayed as the initial image on the display 13. In the example shown in FIG. 8, the 3-dimensional virtual space 32 is constructed in the virtual space coordinate system (vx, vy, vz) defined on the basis of the real object 14 (hereinafter, referred to as a sheet 14-1 because the real object 14 is an object in the form of a sheet in this example), and an image corresponding to the constructed 3-dimensional virtual space 32 is displayed as the initial image on the display 13.

In this 3-dimensional virtual space 32, a room having a floor formed by the virtual region 34 corresponding to the sheet 14-1 is expressed. The floor and walls are expressed in the 3-dimensional virtual space 32 simply to indicate a particular region, and they are not necessarily needed to be displayed.

However, it is desirable to display the floor because the floor explicitly indicates the virtual region 34 corresponding to the sheet 14-1. As will be described later with reference to FIGS. 9 and 10, displaying the floor (virtual region) 34 corresponding to the sheet 14-1 makes it possible to easily and intuitively recognize the correspondences between the position and the angle of the object 33 in the virtual space coordinate system (vx, vy, vz) and the position and the angle of the 3-dimensional position/angle sensor 11-1 in the real object coordinate system (rx, ry, rz) on the basis of the correspondence between the sheet 14-1 and the floor 34 and on the basis of the position and the angle with respect to the sheet 14-1 serving as the reference plane.

When the user wants to place the object 33 at a desired position and angle in the 3-dimensional virtual space 32, the user determines the relative position and angle with respect to the floor 34 and simply places the 3-dimensional position/angle sensor 11-1 at a relative place and angle, corresponding to the determined position and angle, with respect to the sheet 14-1. As a result, as will be described later, the object 33 is placed at the above-described position and angle with respect to the floor 34 in the 3-dimensional virtual space 32, wherein the position and angle correspond to the relative position and angle of the 3-dimensional position/angle sensor 11-1 with respect to the sheet 14-1.

In the example shown in FIG. 8, a picture of a chair 51 and a picture of a desk 52 are drawn on the sheet 14-1. A 3-dimensional model of a chair 61 is placed in the virtual space coordinate system (vx, vy, vz) of the 3-dimensional virtual space 32, at the position corresponding to the position of the picture of the chair 51 in the real object coordinate system (rx, ry, rz). Similarly, a 3-dimensional model 62 is placed in the virtual space coordinate system (vx, vy, vz) of the 3-dimensional virtual space 32, at the position corresponding to the position of the picture of the desk 52 in the real object coordinate system (rx, ry, rz).

In the example shown in FIG. 8, in order to make it possible for the user to easily and intuitively recognize the correspondence between the picture of the chair 51 and the picture of the desk 52, a 3-dimensional model of the chair 61 having a shape similar to that of the picture of the chair 51 and a 3-dimensional model of the desk 62 having a shape similar to that of the picture of the desk 52 are used. If the above purpose is not necessary, simple 3-dimensional models may be placed at the positions where the 3-dimensional model of the chair 61 and the 3-dimensional model of the desk 62 are placed (in the virtual space coordinate system (vx, vy, vz)). That is, the shapes of 3-dimensional models are not limited to those employed in the example shown in FIG. 8, but arbitrary shapes may be used.

It is necessary that the 3-dimensional model of the chair 61 and the 3-dimensional model of the desk 62 should be input to the main controller 12 beforehand by using an arbitrary input device by an arbitrary method.

In the state in which the initial image is displayed on the display 13 (as shown in FIG. 8 in this specific example), if the 3-dimensional position/angle sensor 11-1 (FIG. 2) is moved in the real space 31, the object 33 (FIG. 2) is also moved in the 3-dimensional virtual space 32 in response to the motion of the 3-dimensional position/angle sensor 11-1 as described earlier. The process of moving the object 33 in response to the motion of the 3-dimensional position/angle sensor 11-1 (that is, in response to the operation performed by the user) is performed in steps S8 to S13 shown in FIG. 5.

For example, in the state shown in FIG. 8, let us assume that the places the 3-dimensional position/angle sensor 11-1 on the picture of the desk 52 drawn on the sheet 14-1 (that is, the status of the 3-dimensional position/angle sensor 11-1 is changed from that shown in FIG. 8 into a status described later with reference to FIG. 9).

In response, in step S8 in FIG. 5, position/angle information (the position and the angle of the 3-dimensional position/angle sensor 11-1 expressed in the sensor coordinate system (sx, sy, sz), in this specific example)) is supplied from the 3-dimensional position/angle sensor 11-1 to the object position/angle determination module 42.

In step S9, the object position/angle determination module 42 converts the received position/angle information from the sensor coordinate system (sx, sy, sz) into the real object coordinate system (rx, ry, rz). More specifically, the coordinates of the position/angle information are converted from the sensor coordinate system (sx, sy, sz) to the real object coordinate system (rx, ry, rz) using equation (1).

In step S10, the object position/angle determination module 42 further converts the coordinates of the position/angle information from the real object coordinate system (rx, ry, rz) into the virtual space coordinate system (vx, vy, vz). More specifically, the coordinates of the position/angle information are converted from the real object coordinate system (rx, ry, rz) into the virtual space coordinate system (vx, vy, vz) using equation (2).

Although in the example shown in FIG. 5, steps S9 and S10 are performed separately, steps S9 and S10 may be performed at the same time. For this purpose, in step S4 (FIG. 4), a coordinate transform function in the form of equation (3) that is a combination of equations (1) and (2) is determined instead of determining individual coordinate transform functions in the form of equations (1) and (2).

$$\begin{bmatrix} vx \\ vy \\ vz \\ 1 \end{bmatrix} = \begin{bmatrix} n_{11} & n_{12} & n_{13} & n_{14} \\ n_{21} & n_{22} & n_{23} & n_{24} \\ n_{31} & n_{32} & n_{33} & n_{34} \\ n_{41} & n_{42} & n_{43} & n_{44} \end{bmatrix} \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix} \begin{bmatrix} sx \\ sy \\ sz \\ 1 \end{bmatrix} \quad (3)$$

Equation (3) represents a function used to directly convert coordinates from the sensor coordinate system (sx, sy, sz) into the virtual space coordinate system (vx, vy, vz). In equation (3), m11 to m44 are elements similar to those of the transform matrix in equation (1) by which the sensor coordinate system (sx, sy, sz) is transformed to the real object coordinate system (rx, ry, rz), and n11 to n44 are elements similar to those of the transform matrix in equation (2) by which the real object coordinate system (rx, ry, rz) is transformed to the virtual space coordinate system (vx, vy, vz).

The object position/angle determination module 42 performs a process corresponding to the combination of step S9 and step S10 to directly (in a single operation) transform the coordinates of the input position/angle information from the sensor coordinate system (sx, sy, sz) into the virtual space coordinate system (vx, vy, vz) using equation (3).

In step S11, the object position/angle determination module 42 determines the position and the angle of the object 33 on the basis of the position/angle information transformed into the virtual space coordinate system (vx, vy, vz). In this specific example, because the object 33 is linked with the 3-dimensional position/angle sensor 11-1, the position/angle information transformed into the virtual space coordinate system (vx, vy, vz) is directly employed as the position and the angle of the object 33 in the virtual space coordinate system (vx, vy, vz).

In step S12, the virtual space construction module 43 reconstructs the 3-dimensional virtual space 32 including the object 33 located at the position and the angle (in the virtual space coordinate system (vx, vy, vz)) determined by the object position/angle determination module 42.

In step S13, the display control module 44 displays an image of the 3-dimensional virtual space 32 reconstructed in step S12 by the virtual space construction module 43 on the display 13.

Figure 9:
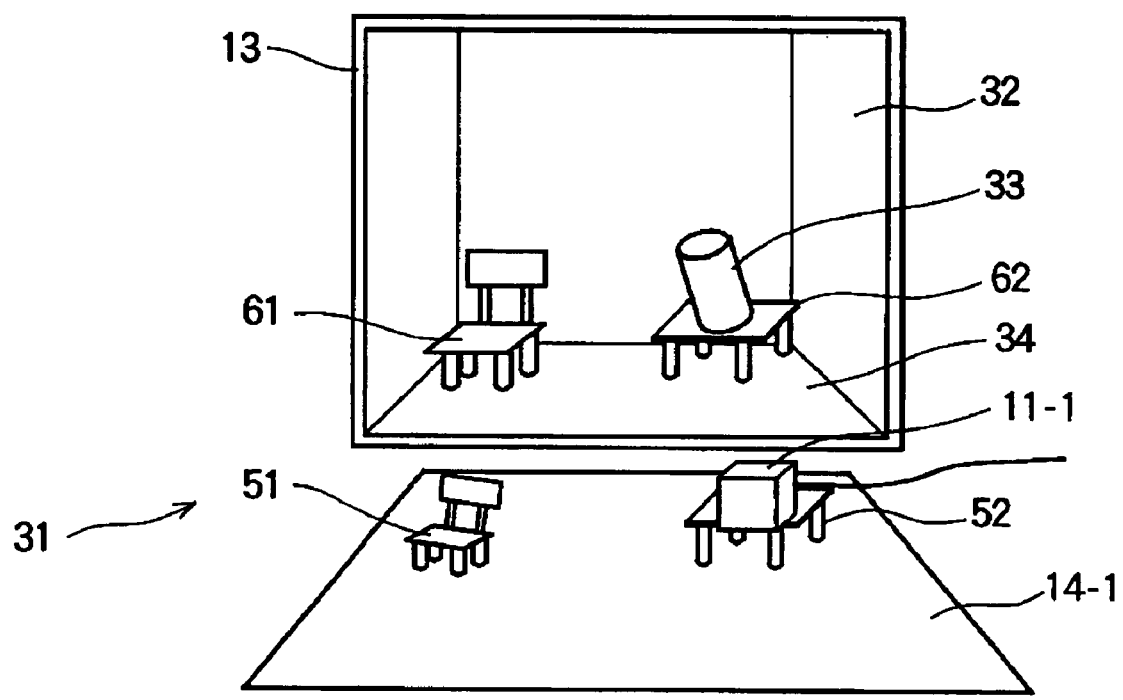
FIG. 9 is a diagram showing an example of a displayed 3-dimensional virtual space reconstructed by placing an object in the 3-dimensional virtual space shown in FIG. 8, wherein an input device corresponding to the object placed in the 3-dimensional virtual space is placed by a user at a particular position with reference to a real object.

In this specific case, as described above, the 3-dimensional position/angle sensor 11-1 is placed on the picture of the desk 52 drawn on the sheet 14-1 as shown in FIG. 9. That is, the 3-dimensional position/angle sensor 11-1 is in contact with the X-Y plane of the real object coordinate system (rx, ry, rz). Therefore, although not shown in FIG. 9, the object 33 in the 3-dimensional virtual space 32 is displayed such that the object 33 is in contact with the floor (virtual region) 34 and, thus, the object 33 penetrates the 3-dimensional model of the desk 62. This manner of displaying the object 33 can be employed without any problem in the case in which the user places the 3-dimensional position/angle sensor 11-1 on the picture of the desk 52 drawn on the sheet 14-1 in order to simply select the 3-dimensional model of the desk 62 in selection between the 3-dimensional model of the chair 61 and the 3-dimensional model of the desk 62.

However, in the case in which the user places the 3-dimensional position/angle sensor 11-1 on the picture of the desk 52 drawn on the sheet 14-1 with the intention of placing the object 33 on the 3-dimensional model of the desk 62, the above manner of displaying the object 33 cannot achieve the intention of the user.

In such a case, it is desirable that the virtual space construction module 43 reconstruct the 3-dimensional virtual space 32 after making a judgment as to penetration between 3-dimensional models. An image of the resultant 3-dimensional virtual space 32 reconstructed in such a manner is displayed on the display 13, for example, as shown in FIG. 9. That is, the object 33 in the 3-dimensional virtual space 32 is displayed (on the display 13) such that the object 33 is located on the 3-dimensional model of the desk 62 without penetrating the 3-dimensional model of the desk 62.

Referring again to FIG. 5, in step S14, the display control module 44 determines whether the condition of ending the process is met.

The condition of ending the process, which is checked in step S14, is not limited to a particular one. For example, inputting of an end command by a user or detection of a particular status of software or hardware such as a shortage of available storage capacity of the storage unit 26 (FIG. 1) can be used as the condition of ending the process.

If it is determined in step S14 that the condition of ending the process is met, the process is ended.

However, if it is determined in step S14 that the condition of ending the process is not met, the process returns to step S8 to repeat steps from S8.

Figure 10:
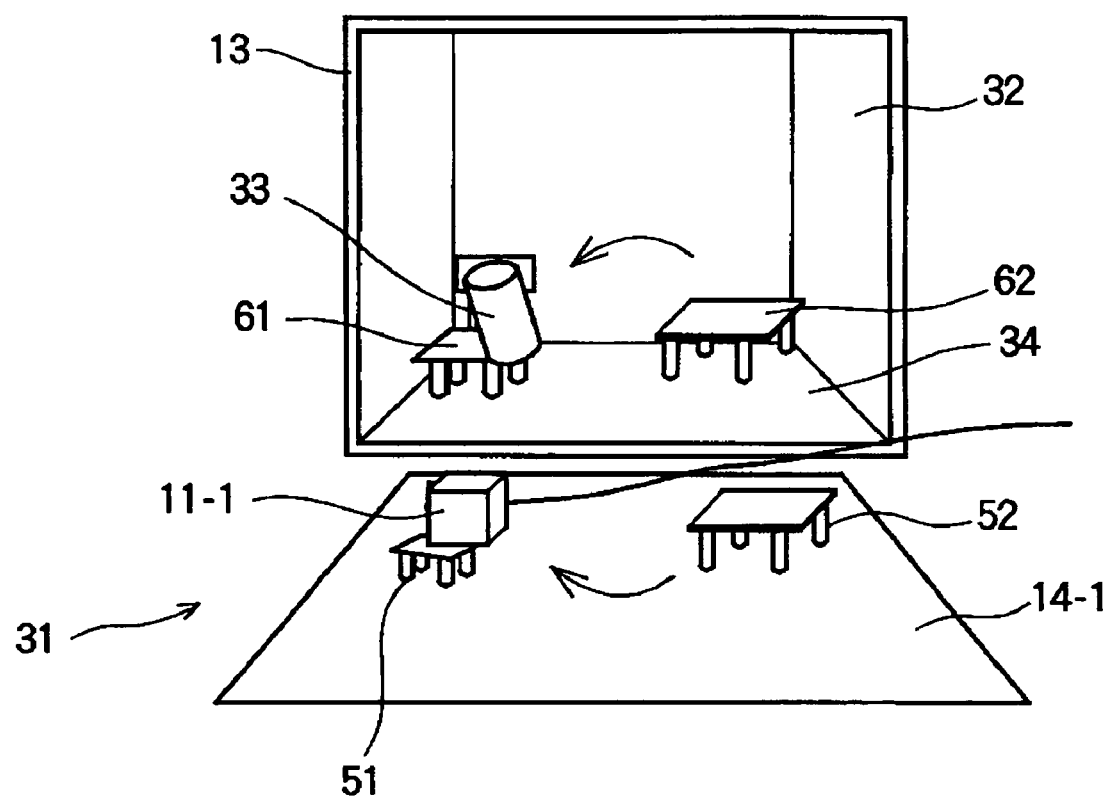
FIG. 10 is a diagram showing an example of a displayed 3-dimensional virtual space reconstructed by placing an object in the 3-dimensional virtual space shown in FIG. 8, wherein the input device is placed by the user at a position different from that shown in FIG. 9 with reference to a real object.

Herein, let us assume that the user moves the 3-dimensional position/angle sensor 11-1, for example, from the position on the picture of the desk 52 drawn on the sheet 14-1 to the position on the picture of the chair 51 as shown in FIG. 10. That is, the status of the 3-dimensional position/angle sensor 11-1 is changed from that shown in FIG. 9 into a status shown in FIG. 10.

In this case, it is determined in step S14 that an end command is not issued and, thus, steps S8 to S13 are repeated.

Thus, the object position/angle determination module 42 again acquires the position/angle information of the 3-dimensional position/angle sensor 11-1, converts the coordinates thereof into the virtual space coordinate system (vx, vy, vz), and employs the resultant position and the angle in the virtual space coordinate system (vx, vy, vz) as the new position and angle of the object 33. The virtual space construction module 43 then reconstructs the 3-dimensional virtual space 32 including the object 33 located at the newly determined position and angle. The display control module 44 displays an image of the reconstructed 3-dimensional virtual space 32 on the display 13.

More specifically, in this particular case, the image such as that shown in FIG. 10 is displayed on the display 13. That is, in the image displayed on the display 13, the object 33 in the 3-dimensional virtual space 32 is moved from the previous position on the 3-dimensional model of the desk 62 to the new position on the 3-dimensional model of the chair 61.

In the example shown in FIG. 10, as in the example shown in FIG. 9, the judgment as to the penetration is performed, and the object 33 is placed on the 3-dimensional model of the chair 61 such that no penetration occurs. However, as described earlier, the judgment as to penetration is not necessarily needed. However, if judgment of penetration is not performed, the object 33 is displayed such that it is in contact with the floor (virtual region) 34 and, thus, object 33 penetrates the 3-dimensional model of the chair 61.

By performing steps S8 to S13 repeatedly in the above-described manner, the object 33 in the 3-dimensional virtual space 32 moves from the 3-dimensional model of the desk 62 to the 3-dimensional model of the chair 61 via a path corresponding to a path via which the 3-dimensional position/angle sensor 11-1 is moved by the user, with substantially no delay from the movement of the 3-dimensional position/angle sensor 11-1.

Although the present invention has been described above with reference to the embodiment of the information processing apparatus 1 configured as shown in FIG. 2, the present invention is not limited to the specific embodiment shown in FIG. 2, but may be embodied in various manners.

For example, the form of the real object 14 used as the reference object in the virtual space coordinate system (vx, vy, vz) is not limited to a particular one such as the sheet 14-1 employed above, but the real object 14 may be in an arbitrary form as long as it has an area greater than a predetermined value at least in a predetermined direction.

Figure 11:
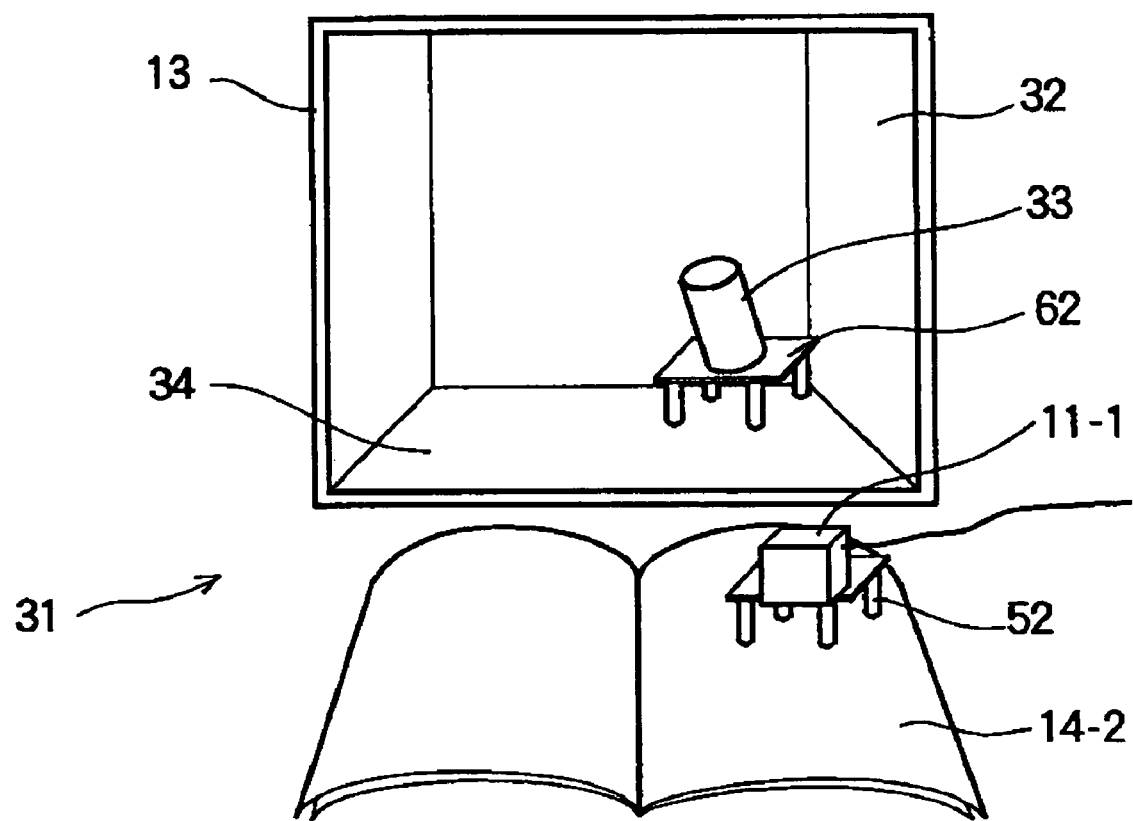
FIG. 11 is a diagram showing an example of a displayed 3-dimensional virtual space constructed by the information processing apparatus shown in FIG. 3, wherein a book is used as the real object.

For example, a book 14-2 formed of a stack of sheets of paper may be used as the real object 14 as shown in FIG. 11. In this case, the main controller 12 (FIG. 1) of the information processing apparatus 1 may define the real object coordinate system (rx, ry, rz) of the real space 31 by employing the surface (printed surface) of a page of the book 14-2 as the X-Y plane and taking the Z axis in a direction normal to the surface of the page. Furthermore, the main controller 12 defines the virtual space coordinate system (vx, vy, vz) of the 3-dimensional virtual space 32 with respect to the defined real object coordinate system (rx, ry, rz). As a matter of course, the manner of defining the coordinate systems is not limited to such the manner described above, but the coordinate systems may be defined in various manners.

As a result, as shown in FIG. 11, the 3-dimensional virtual space 32 is displayed on the display 13 such that a virtual region 34 corresponding to the surface (X-Y plane) of the page of the book 14-2 is displayed as a floor. If the 3-dimensional position/angle sensor 11-1 is placed on a picture of a desk 52, the object 33 is placed on the 3-dimensional model of the desk 62 in the 3-dimensional virtual space 32 (in the image displayed on the display 13). In the example shown in FIG. 11, it is assumed that judgment as to penetration is performed.

In the case in which a single sheet 14-1 is used as the real object 14, as is the case in FIGS. 8 to 10, only one scene is defined in the 3-dimensional virtual space 32. In contrast, if a book 14-2 formed of a stack of sheets of paper is used as the real object 14 as shown in FIG. 11, a large number of different scenes (drawn on respective pages) can be defined in the 3-dimensional virtual space by turning over pages of the book 14-2.

Figure 12:
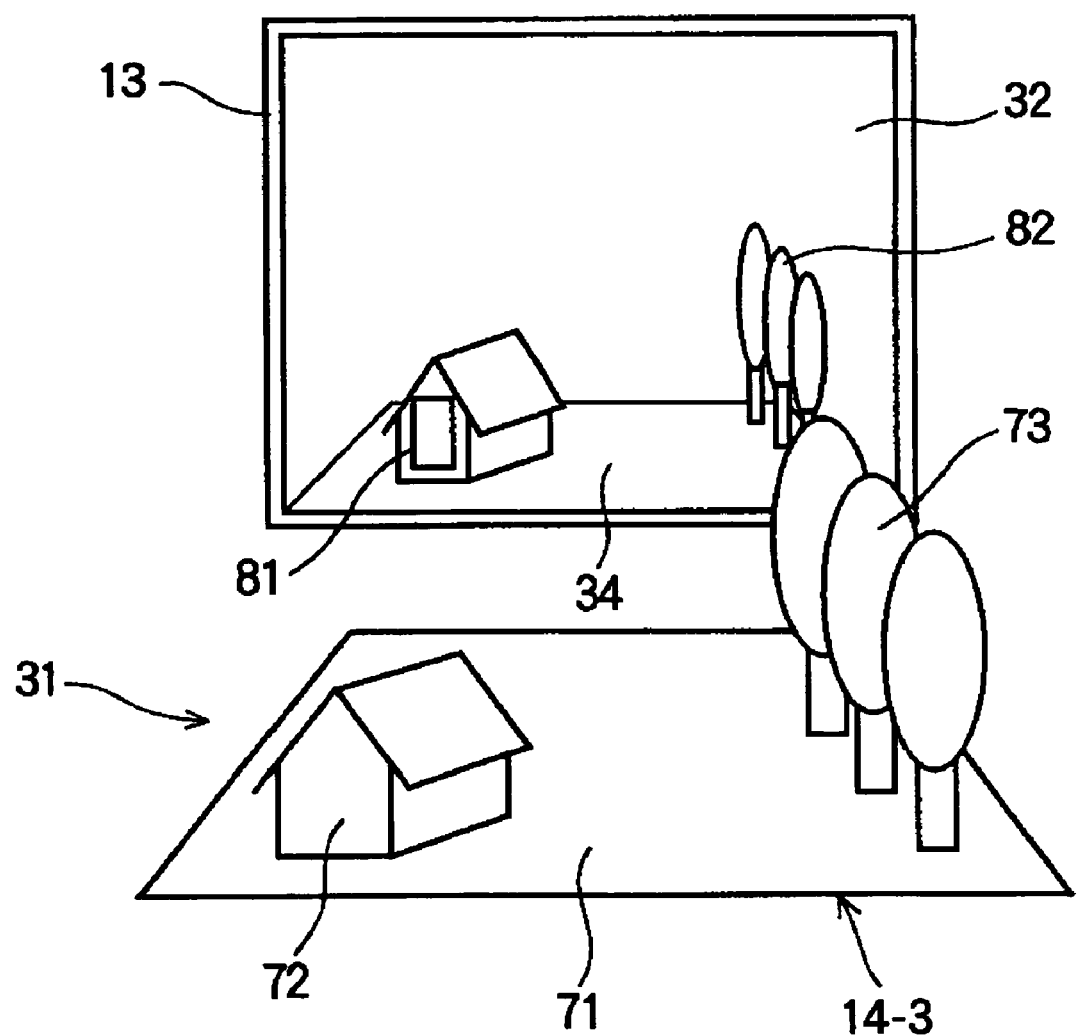
FIG. 12 is a diagram showing an example of a displayed 3-dimensional virtual space constructed by the information processing apparatus shown in FIG. 3, wherein a combination of a model and a board is used as the real object.

As shown in FIG. 12, an object 14-3 including a board 71 and models 72 and 73 placed on the board 71 may be used as the real object 14. The material of the board 71 is not limited to paper such as that employed as the material for the sheet 14-1 (FIGS. 8 to 10) or for the book 14-2 (FIG. 11), but an arbitrary material may be employed as long as it has an area.

In this case, as shown in FIG. 12, a 3-dimensional virtual space 32 is displayed on the display 13 such that a virtual region 34 corresponding to the board 71 is displayed as the ground.

In the case in which the real object 14 includes not only a part (the board 71, in the example shown in FIG. 12) used to define a coordinate system but also another part (the model 72 and the model 73 in the example shown in FIG. 12) that is not used to define the coordinate system as is the case with the real object 14-3 shown in FIG. 12, it is desirable that the 3-dimensional virtual space 32 include 3-dimensional models having similar shapes (a 3-dimensional mode of a house 81 corresponding to a model of a house 72, and a 3-dimensional model of trees 82 corresponding to a model of trees 73, in the example shown in FIG. 12), because those models make it possible for the user to easily recognize the correspondence between the real space 31 and the 3-dimensional virtual space 32. That is, those models make it possible for the user to more easily and intuitively perform manipulation in the 3-dimensional virtual space 32 by performing manipulation with respect to the model 72 or 73.

Figure 13:
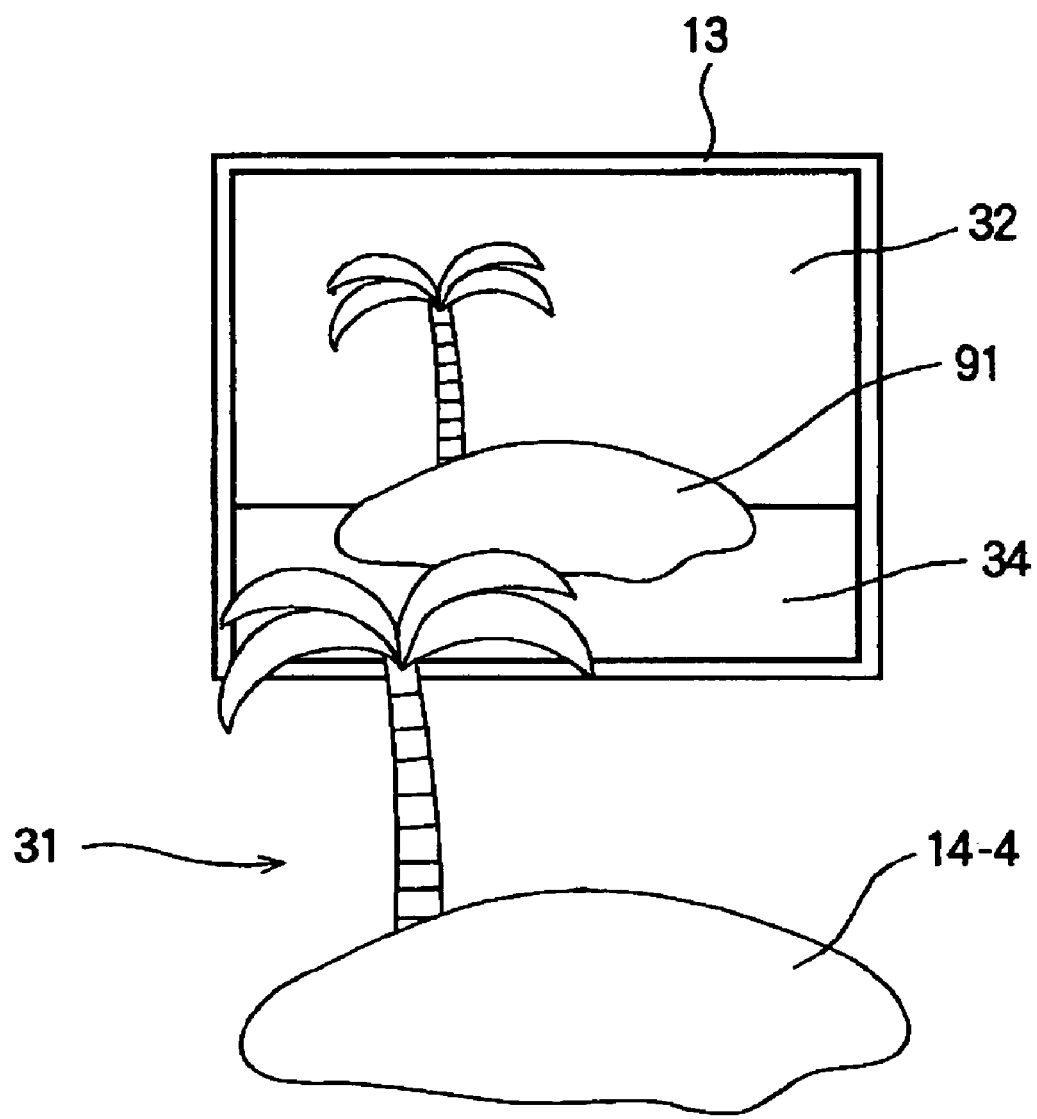
FIG. 13 a diagram showing an example of a displayed 3-dimensional virtual space constructed by the information processing apparatus shown in FIG. 3, wherein a model is used as the real object.

A model 14-4 having an arbitrary shape such as that shown in FIG. 13 also may be used as the real object 14. Because the real object coordinate system (rx, ry, rz) can be defined in the real space 31 in an arbitrary manner as described earlier, the main controller 12 (FIG. 1) of the information processing apparatus 1 may define the real object coordinate system (rx, ry, rz) with respect to an object having an arbitrary shape such as the model 14-4. In the example shown in FIG. 13, the real object coordinate system (rx, ry, rz) of the real space 31 may be defined, for example, by projecting the model 14-4 onto the floor surface and employing the resultant projective plane as the X-Y plane. As a manner of course, as described earlier, the manner of defining the X, Y, and Z axes is not limited to that employed herein.

In the example shown in FIG. 13, the 3-dimensional virtual space 32 (the image of the 3-dimensional virtual space 32) is displayed on the display 13 such that the virtual region 34 corresponding to the X-Y plane (the projective plane of the model 14-4) defined in the real space 31 is displayed at the bottom of the screen of the display 13.

In the example shown in FIG. 13, the virtual region 34 is not represented explicitly unlike the previous examples in which the virtual region 34 is explicitly represented by the floor or the ground. In such a case, it is desirable that a 3-dimensional model 91 having a shape similar to that of the model 14-4 (used as the reference object) be displayed in the 3-dimensional virtual space 32 as shown in FIG. 13. This makes it possible, as with the example shown in FIG. 12, for the user to easily recognize the correspondence between the real space 31 and the 3-dimensional virtual space 32. Thus, as with the previous examples, the user can easily and intuitively perform manipulation in the 3-dimensional virtual space 32 by using the model 14-4 as the reference object.

Not only the real object 14 but also the input unit 11 having the first capability also may be embodied in various fashions.

For example, in the example shown in FIG. 2, because the coordinate system (the sensor coordinate system (sx, sy, sz)) used to express the position/angle information output from the 3-dimensional position/angle sensor 11-1 is different from the coordinate system (the real object coordinate system (rx, ry, rz)) of the real space 31 defined with respect to the real object 14, the information processing apparatus 1 transforms the coordinate system from the sensor coordinate system (sx, sy, sz) to the real object coordinate system (rx, ry, rz) via steps S1 and S4 in FIG. 4 and step S9 in FIG. 5.

The coordinate system transform makes it possible for the user to easily manipulate the 3-dimensional position/angle sensor 11-1 with reference to the real object 14 (using the real space coordinate system (rx, ry, rz)) without awareness of the sensor coordinate system (sx, sy, sz) even when the 3-dimensional position/angle sensor 11-1 has its own sensor coordinate system (sx, sy, sz).

In the case in which an input device used as the input unit 11 having the first capability outputs position/angle information expressed in a coordinate system (the sensor coordinate system (sx, sy, sz)) that is the same as the coordinate system (real object coordinate system (rx, ry, rz)) of the real space 31, the coordinate transform from the sensor coordinate system (sx, sy, sz) to the real object coordinate system (rx, ry, rz) is not necessary.

Figure 14:
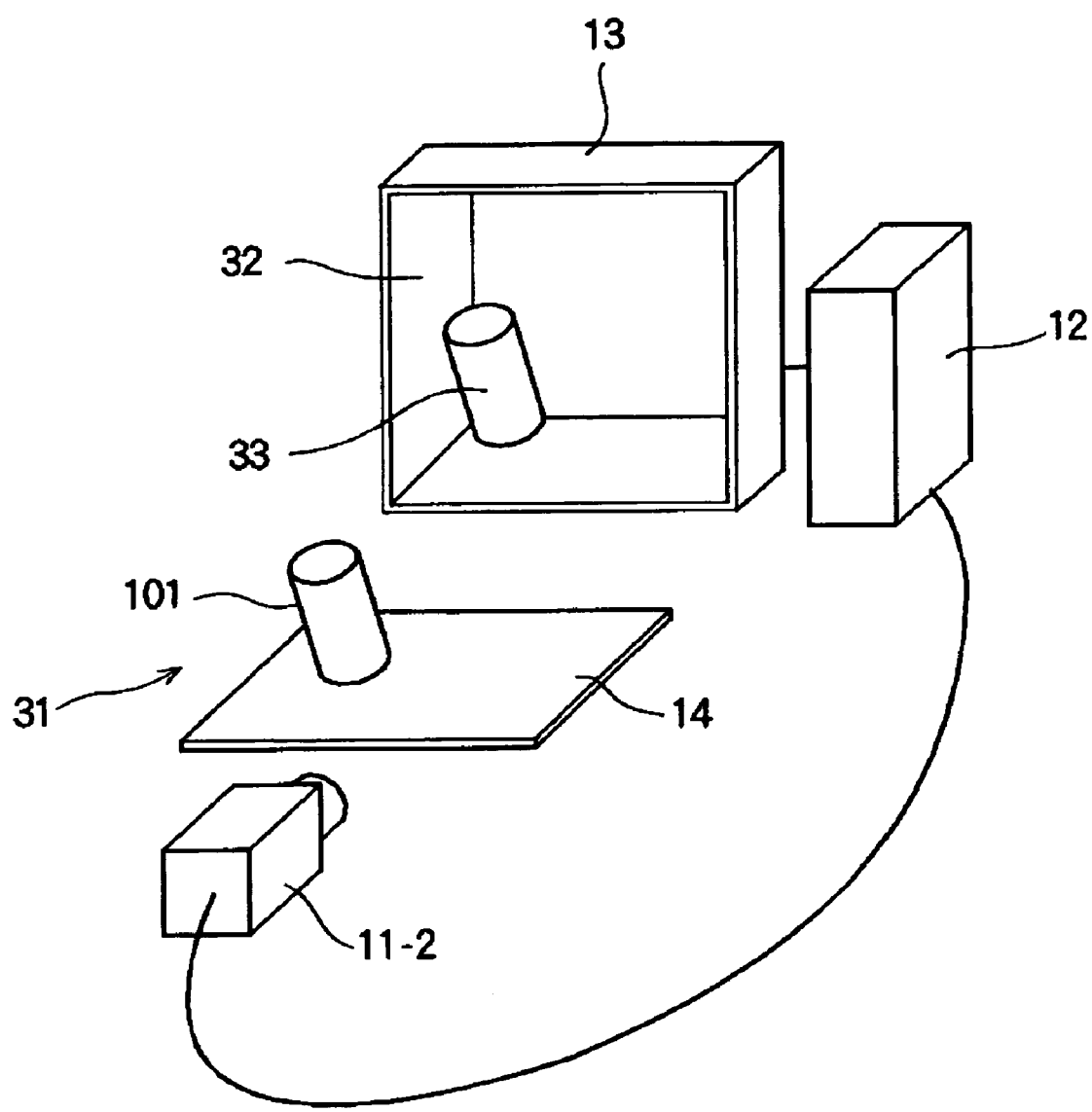
FIG. 14 is a diagram showing another example of the outward appearance of the information processing apparatus shown in FIG. 1.

As shown in FIG. 14, an arbitrary real object 101 independent of the 3-dimensional position/angle sensor may be used as the real object linked with an object 33, and the position and the angle of the real object 101 in the real space 31 may be input using a camera 11-2 or the like. That is, in the example shown in FIG. 14, the camera 11-2 serves as the input unit 11 having the first capability, and the main controller 12 detects the position and the angle of the real object 101 in the real space 31 by performing image processing on the image of the real object 101 taken by the camera 11-2.

Although an arbitrary real object can be used as the real object 101, it is desirable to use a real object that reminds the user of the object 33, because the real object 101 is linked with the object 33. That is, it is desirable that the real object 101 have a feature similar to that of the object 33. In the example shown in FIG. 14, in view of the above, an object having a shape similar to that of the object 33 is used as the real object 101. The features of the object 33 can include not only the shape but also other features such as a color or a relative size in the 3-dimensional virtual space 32, and, thus, an object having a feature similar to one of those features of the object 33 may be used as the real object 101.

In other words, although the real object 101 by itself does not have a particular function in the information processing apparatus 1, the similarity in feature with the object 33 reminds the user of the object 33. If the user changes the position or the angle of the real object 101 in the real space 31, the position or the angle of the object 33 in the 3-dimensional virtual space 32 is changed in response to the change in the position or the angle of the real object 101 and, thus, the real object 101 can function, in effect, as an input device (that can be used instead of the 3-dimensional position/angle sensor 11-1) that works in conjunction with the camera 11-2. In this case, of the input unit 11, the part having the first capability is embodied not only by the camera 11-2 but by a combination of the camera 11-2 and the real object 101.

As described above, in the information processing apparatus according to the present invention, a first coordinate system (for example, the real object coordinate system (rx, ry, rz)) is defined in the real space with reference to a particular real object, and a second coordinate system (for example, the virtual space coordinate system (vx, vy, vz)) is defined in the 3-dimensional virtual space on the basis of the first coordinate system, so that a user can easily and intuitively manipulate an object in the 3-dimensional virtual space by using the real object as a reference object. This is very useful, in particular, in that the user can get ability of perception in a direction away from a view point, which could otherwise not be obtained.

In the conventional techniques, an input device manipulated by a user has a third coordinate system (for example, the sensor coordinate system (sx, sy, sz) in the case in which a 3-dimensional position/angle sensor is used as the input device) that is specific to the input device and is not related with the second coordinate system in the 3-dimensional virtual space and, thus, the user cannot intuitively manipulate the input device. This makes it very difficult for the user to manipulate an object in the 3-dimensional virtual space.

In contrast, in the present invention, the first coordinate system is defined with reference to a real object, and the second coordinate system is defined in the 3-dimensional virtual space with reference to the first coordinate system. Therefore, the 3-dimensional virtual space expressed in the second coordinate system and the real space expressed in the first coordinate system correspond with each other. In this case, the position and the angle of the input device manipulated are expressed in the first coordinate system directly related with the second coordinate system. As such, the user can easily and intuitively manipulate an object in the 3-dimensional virtual space expressed in the second coordinate system (even in the case in which the input device has a third coordinate system as in the conventional technique, the user can manipulate the input device without awareness of the third coordinate system, because the coordinate system is transformed).

When the processing sequence is executed by software, a program forming the software may be installed from a storage medium or via a network onto a computer which is provided as dedicated hardware or may be installed onto a general-purpose computer capable of performing various processes in accordance with various programs installed thereon.

Specific examples of storage media usable for the above purpose include, as shown in FIG. 1, a removable storage medium (package medium) 29, such as a magnetic disk (for example, a floppy disk), an optical disk (for example, a CD-ROM (Compact Disk-Read Only Memory) or a DVD (Digital Versatile Disk)), a magnetooptical disk (for example, a MD (Mini-Disk)), and a semiconductor memory, on which a program is stored and which is supplied to a user separately from a computer. A program also may be supplied to a user by preinstalling it on a built-in ROM 22 or a storage unit 26 such as a hard disk disposed in a computer.

The coordinate system setting module 41, the object position/angle determination module 42, the virtual space construction module 43, and the display control module 44, shown in FIG. 3, are not limited to particular types, as long as their functions are achieved. For example, those modules may be implemented via hardware. In the case in which the modules are implemented via hardware, a manufacturer may produce hardware parts corresponding to the coordinate system setting module 41, the object position/angle determination module 42, the virtual space construction module 43, and the display control module 44, and connect them with one another as shown in FIG. 3 thereby essentially embodying the information processing apparatus 1 according to the present invention, in a different manner from that shown in FIG. 1.

The modules described above are not limited to those shown in FIG. 3, but they may be configured in different manners (they may be divided into sub modules) as long as they can perform, as a whole, the process corresponding to the flow charts shown in FIGS. 4 and 5. Alternatively, the modules may be combined into a single software program having a single algorithm.

In the present description, the steps described in the program stored in the storage medium may be performed either in time sequence in accordance with the order described in the program or in a parallel or separate fashion.

As can be understood from the above description, the present invention makes it possible to construct a 3-dimensional virtual space and display an image corresponding to the constructed 3-dimensional virtual space. A user can easily and intuitively manipulate information in the 3-dimensional virtual space.

Although the present invention has been described with reference to specific embodiments, those of skill in the art will recognize that changes may be made thereto without departing from the spirit and scope of the present invention as set forth in the hereafter appended claims.

The invention claimed is:

1. An information processing method for controlling a display of an image in a 3-dimensional virtual space, the method comprising the steps of:

setting a first coordinate system in a real space including a real object, the real object including a surface part and a shape part, wherein the first coordinate system is based on pre-input information associated with the position and the angle of the surface part of the real object, and wherein the position of the shape part of the real object in the first coordinate system is based on pre-input information associated with the shape part of the real object;

setting a second coordinate system in the 3-dimensional virtual space corresponding to the real space based on the first coordinate system;

inputting specification information via an input device having a third coordinate system to specify a position and an angle of a particular virtual object in the 3-dimensional virtual space;

determining via a determination part the position and the angle, in the second coordinate system, of the virtual object based on the specification information input via the input device and the third coordinate system;

constructing the 3-dimensional virtual space using the second coordinate system set in the setting step, wherein the 3-dimensional virtual space includes a 3-dimensional model corresponding to the shape part of the real object, a virtual region corresponding to the surface part of the real object, and the virtual object located at the position and the angle in the second coordinate system determined by the determination part, wherein the determination part determines whether there is a penetration of the virtual object with the 3-dimensional model; and controlling the display of an image corresponding to the 3-dimensional virtual space constructed in the constructing step, wherein the virtual object is displayed penetrating the 3-dimensional model corresponding to the shape part of the real object when a penetration is determined by the determination part.

2. An information processing method according to claim 1, wherein the input device is an image device.

3. An information processing method according to claim 1, wherein the first real object has a three-dimensional value.

4. An information processing method according to claim 1, wherein the third coordinate system is different from the first coordinate system.

5. An information processing method according to claim 1, wherein the shape part of the real object is a picture and the 3-dimensional model corresponds to the picture.

6. An information processing method according to claim 1, wherein the position and angle of the particular virtual object in the 3-dimensional virtual space correspond to a position and an angle of the input device with reference to the real object.

7. An information processing apparatus for controlling a display of an image in a 3-dimensional virtual space, comprising:

a setting part for setting a first coordinate system in a real space including a first real object, the first real object including a surface part and a shape part, wherein the first coordinate system is based on pre-input information associated with the position and the angle of the surface part of the first real object, and wherein the position of the shape part of the first real object in the first coordinate system is based on pre-input information associated with the shape part of the first real object, and for setting a second coordinate system in the 3-dimensional virtual space corresponding to the real space based on the first coordinate system;

a construction part for constructing the 3-dimensional virtual space using the second coordinate system set by the setting part, wherein the 3-dimensional virtual space includes a 3-dimensional model corresponding to the shape part of the first real object and a virtual region corresponding to the surface part of the first real object;

an input device for inputting specification information specifying a position and an angle of a particular virtual object in the 3-dimensional virtual space, the input device having a third coordinate system;

a determination part for determining the position and the angle, in the second coordinate system, of the virtual object based on the specification information input via the input device and the third coordinate system, and for determining whether there is a penetration of the virtual object with the 3-dimensional model, wherein the construction part constructs the 3-dimensional virtual space including the virtual object located at the position and the angle in the second coordinate system determined by the determination part; and a display control part for controlling the display of an image corresponding to the 3-dimensional virtual space constructed by the construction part, wherein the virtual object is displayed penetrating the 3-dimensional model corresponding to the shape part of the first real object when a penetration is determined by the determination part.

8. An information processing apparatus according to claim 7, wherein the first real object is a real object having a cross-sectional area greater than a predetermined value at least in a predetermined direction.

9. An information processing apparatus according to claim 8, wherein the first real object is one of a sheet-shaped real object and a stack of sheet-shaped real objects.

10. An information processing apparatus according to claim 7, wherein if a second real object corresponding to the virtual object is placed in the real space, the input device measures a position and an angle of the second real object in the real space using a third coordinate system different from the first coordinate system and inputs a measurement result as the specification information, and the determination part converts the coordinates of the position and the angle, input via the input device, of the second real object from the third coordinate system into the second coordinate system, and employs the position and the angle of the second real object converted in the second coordinate system as the position and the angle of the virtual object in the second coordinate system.

11. An information processing apparatus according to claim 10, wherein the input device uses at least a part of the input device itself as the second real object.

12. An information processing apparatus according to claim 10, wherein the input device uses, as the second real object, a real object having a feature similar to a particular feature of the virtual object.

13. An information processing apparatus according to claim 7, wherein the construction part constructs the 3-dimensional virtual space such that the image displayed under control of the display control part includes at least the virtual region.

14. An information processing apparatus according to claim 7, wherein the input device is an image device.

15. An information processing apparatus according to claim 7, wherein the first real object has a three-dimensional value.

16. An information processing apparatus according to claim 7, wherein the third coordinate system is different from the first coordinate system.

17. An information processing apparatus according to claim 7, wherein the shape part of the first real object is a picture and the 3-dimensional model corresponds to the picture.

18. An information processing apparatus according to claim 7, wherein the position and angle of the particular virtual object in the 3-dimensional virtual space correspond to a position and an angle of the input device with reference to the first real object.

19. A computer program product embodied in a computer readable storage medium encoded with a computer program executable on an information processing apparatus for controlling a display of an image in a 3-dimensional virtual space, the process comprising the steps of:

setting a first coordinate system in a real space including a real object, the first real object including a surface part and a shape part, wherein the first coordinate system is based on pre-input information associated with the position and the angle of the surface part of the real objects, and wherein the position of the shape part of the real object in the first coordinate system is based on pre-input information associated with the shape part of the real object;

setting a second coordinate system in the 3-dimensional virtual space corresponding to the real space based on the first coordinate system;

inputting specification information via an input device having a third coordinate system to specify a position and an angle of a particular virtual object in the 3-dimensional virtual space;

determining via a determination part the position and the angle, in the second coordinate system, of the virtual object based on the specification information input via the input device and the third coordinate system;

constructing the 3-dimensional virtual space using the second coordinate system set in the setting step, wherein the 3-dimensional virtual space includes a 3-dimensional model corresponding to the shape part of the real object, a virtual region corresponding to the surface part of the real object, and the virtual object located at the position and the angle in the second coordinate system determined by the determination part, wherein the determination part determines whether there is a penetration of the virtual object with the 3-dimensional model; and controlling the display of an image corresponding to the 3-dimensional virtual space constructed in the constructing step, wherein the virtual object is displayed penetrating the 3-dimensional model corresponding to the shape part of the real object when a penetration is determined by the determination part.

20. A computer program product embodied in a computer readable storage medium encoded with a computer program executable on an information processing apparatus according to claim 19, wherein the input device is an image device.

21. A computer program product embodied in a computer readable storage medium encoded with a computer program executable on an information processing apparatus according to claim 19, wherein the first real object has a three-dimensional value.

22. A computer program product embodied in a computer readable storage medium encoded with a computer program executable on an information processing apparatus according to claim 19, wherein the third coordinate system is different from the first coordinate system.

23. A computer program product embodied in a computer readable storage medium encoded with a computer program executable on an information processing apparatus according to claim 19, wherein the shape part of the first real object is a picture and the 3-dimensional model corresponds to the picture.

24. A computer program product embodied in a computer readable storage medium encoded with a computer program executable on an information processing apparatus according to claim 19, wherein the position and angle of the particular virtual object in the 3-dimensional virtual space correspond to a position and an angle of the input device with reference to the real object.

* * * * *